US011523313B2

(12) United States Patent
Latheef et al.

(10) Patent No.: US 11,523,313 B2
(45) Date of Patent: Dec. 6, 2022

(54) METHOD AND APPARATUS FOR HANDLING HANDOVER IN WIRELESS COMMUNICATION SYSTEM

(71) Applicant: Samsung Electronics Co., Ltd., Suwon-si (KR)

(72) Inventors: Fasil Abdul Latheef, Bangalore (IN); Mangesh Abhimanyu Ingale, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 16/865,839

(22) Filed: May 4, 2020

(65) Prior Publication Data

US 2020/0351735 A1 Nov. 5, 2020

(30) Foreign Application Priority Data

May 3, 2019 (IN) .............................. 201941017815
Apr. 21, 2020 (IN) .............................. 202042017148

(51) Int. Cl.
*H04W 4/00* (2018.01)
*H04W 36/00* (2009.01)

(52) U.S. Cl.
CPC . *H04W 36/00837* (2018.08); *H04W 36/0085* (2018.08)

(58) Field of Classification Search
None
See application file for complete search history.

(56) References Cited

U.S. PATENT DOCUMENTS 10,064,051 B2 8/2018 Ingale et al.
2010/0124203 A1* 5/2010 Tenny ................... H04W 36/24
370/331

(Continued)

FOREIGN PATENT DOCUMENTS

IN 2018-17047839 A 3/2019
KR 10-2018-0122963 A 11/2018

(Continued)

OTHER PUBLICATIONS

Intel Corporation, Report of the email discussion [105#58][NR/MOB] Comparison of LTE and NR Conditional handover, R2-1903450, 3GPP TSG RAN WG2 Meeting #105bis, Mar. 29, 2019, sections 2.1, 2.2, 3.2, Xi'an, China.

(Continued)

*Primary Examiner* — Suhail Khan
(74) *Attorney, Agent, or Firm* — Jefferson IP Law, LLP

(57) ABSTRACT

The disclosure relates to a communication method and a system for converging a $5^{th}$-Generation (5G) communication system for supporting higher data rates beyond a $4^{th}$-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. A method for executing a handover by a UE in a wireless communication system is provided. The method includes (Continued)

receiving, by a user equipments (UE), from a source cell a handover configuration comprising an execution condition associated with at least one candidate target cell from a plurality of candidate target cells and a configuration associated with the at least one candidate target cell from a plurality of candidate target cells.

20 Claims, 11 Drawing Sheets

(56) References Cited

U.S. PATENT DOCUMENTS

| | | |
|---|---|---|
| 2015/0312818 A1 | 10/2015 | Yiu et al. |
| 2016/0057663 A1* | 2/2016 | Teyeb ............... H04W 36/0069 455/436 |
| 2016/0302117 A1 | 10/2016 | Inoue et al. |
| 2019/0116585 A1 | 4/2019 | Chakraborty et al. |
| 2020/0022035 A1* | 1/2020 | Kadiri ............... H04W 36/0072 |
| 2020/0077314 A1 | 3/2020 | Hwang et al. |
| 2020/0229054 A1* | 7/2020 | Lee ..................... H04W 8/02 |
| 2021/0120458 A1* | 4/2021 | Koskela ............ H04W 36/0016 |

FOREIGN PATENT DOCUMENTS

| | | |
|---|---|---|
| WO | 2018/170777 A1 | 9/2018 |
| WO | 2018/230997 A1 | 12/2018 |

OTHER PUBLICATIONS

Motorola Mobility et al., NR mobility enhancement, R1-1904937, 3GPP TSG RAN WG1 #96bis, Mar. 30, 2019, sections 2, 3, Xi'an, China.
Samsung, Introduction of conditional handover for NR-U, R2-1905155, 3GPP TSG RAN WG2 Meeting #105bis, Mar. 29, 2019, section 2, Xi'an, China.
Huawei et al., Overview on NR mobility enhancements, R1-1903113, 3GPP TSG RAN WG1 Meeting #96, Feb. 16, 2019, sections 2.3, 2.4, Athens, Greece.
International Search Report dated Jul. 28, 2020, issued in International Application No. PCT/KR2020/005833.
Ericsson, Triggering of Conditional Handover in NR, R2-1906211, 3GPP TSG RAN WG2 #106, May 2, 2019, Reno, US.
Indian Office Action dated Nov. 3, 2021, issued in Indian Application No. 201941017815.
European Search Report dated Jan. 4, 2022, issued in European Application No. 20801825.9.
Indian Office Action dated Nov. 17, 2021, issued in Indian Patent Application No. 202042017148.

* cited by examiner

METHOD AND APPARATUS FOR HANDLING HANDOVER IN WIRELESS COMMUNICATION SYSTEM

CROSS-REFERENCE TO RELATED APPLICATION(S)

This application is based on and claims priority under 35 U.S.C. § 119(a) of an Indian Provisional patent application number 201941017815, filed on May 3, 2019, in the Indian Intellectual Property Office, and of an Indian patent application number 202042017148, filed on Apr. 21, 2020, in the Indian Intellectual Property Office, the disclosure of each of which is incorporated by reference herein in its entirety.

BACKGROUND

1. Field

The disclosure relates to a wireless communication system. More particularly, the disclosure relates to a method and a user equipment (UE) for handling a handover in the wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analysing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies, such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and a user equipment (UE) for controlling enhanced mobility in a long term evolution (LTE) and a New Radio (NR).

Another aspect of the disclosure is to provide a method and a UE for handling a handover in a wireless communication system.

Another aspect of the disclosure is to provide a method and a UE for accessibility measurement based on a radio resource control (RRC) connection establishment failure in a wireless communication system.

Additional aspects will be set forth in part in the description which follows and, in part, will be apparent from the description, or may be learned by practice of the presented embodiments.

In accordance with an aspect of the disclosure, a method for executing a handover by a terminal in a wireless communication system is provided. The method includes receiving a radio resource control (RRC) message including a configuration for conditional handover (CHO), wherein the configuration for CHO includes an execution condition associated with a candidate target cell, the execution condition including a first measurement identity (ID) and a second measurement ID, determining whether triggering condition for the first measurement ID and the second measurement ID are fulfilled for the candidate target cell, and executing the CHO to the candidate target cell in case that the triggering conditions are fulfilled.

In accordance with another aspect of the disclosure, a method performed by a base station in a wireless communication system is provided. The method includes transmitting, to a terminal, a radio resource control (RRC) message including a configuration for conditional handover (CHO), wherein the configuration for CHO includes an execution condition associated with a candidate target cell, the execution condition including a first measurement identity (ID) and a second measurement ID, receiving, from the terminal, a measurement report in case that triggering condition for the first measurement ID and the second measurement ID are fulfilled for the candidate target cell, and transmitting, to the candidate target cell, a handover request message in response to the measurement report.

In accordance with another aspect of the disclosure, a terminal in a wireless communication system is provided. The terminal includes a transceiver configured to transmit and receive a signal, and a controller coupled with the transceiver and configured to receive a radio resource control (RRC) message including a configuration for conditional handover (CHO), wherein the configuration for CHO includes an execution condition associated with a candidate target cell, the execution condition including a first measurement identity (ID) and a second measurement ID, determine whether triggering condition for the first measurement ID and the second measurement ID are fulfilled for the candidate target cell, and execute the CHO to the candidate target cell in case that the triggering conditions are fulfilled.

In accordance with another aspect of the disclosure, a base station in a wireless communication system is provided. The base station includes a transceiver configured to transmit and receive a signal, and a controller coupled with the transceiver and configured to transmit, to a terminal, a radio resource control (RRC) message including a configuration for conditional handover (CHO), wherein the configuration for CHO includes an execution condition associated with a candidate target cell, the execution condition including a first measurement identity (ID) and a second measurement ID, receive, from the terminal, a measurement report in case that triggering condition for the first measurement ID and the second measurement ID are fulfilled for the candidate target cell, and transmit, to the candidate target cell, a handover request message in response to the measurement report.

Additional aspects will be set forth in part in the description which follows and, in part, will be apparent from the description, or may be learned by practice of the presented embodiments.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
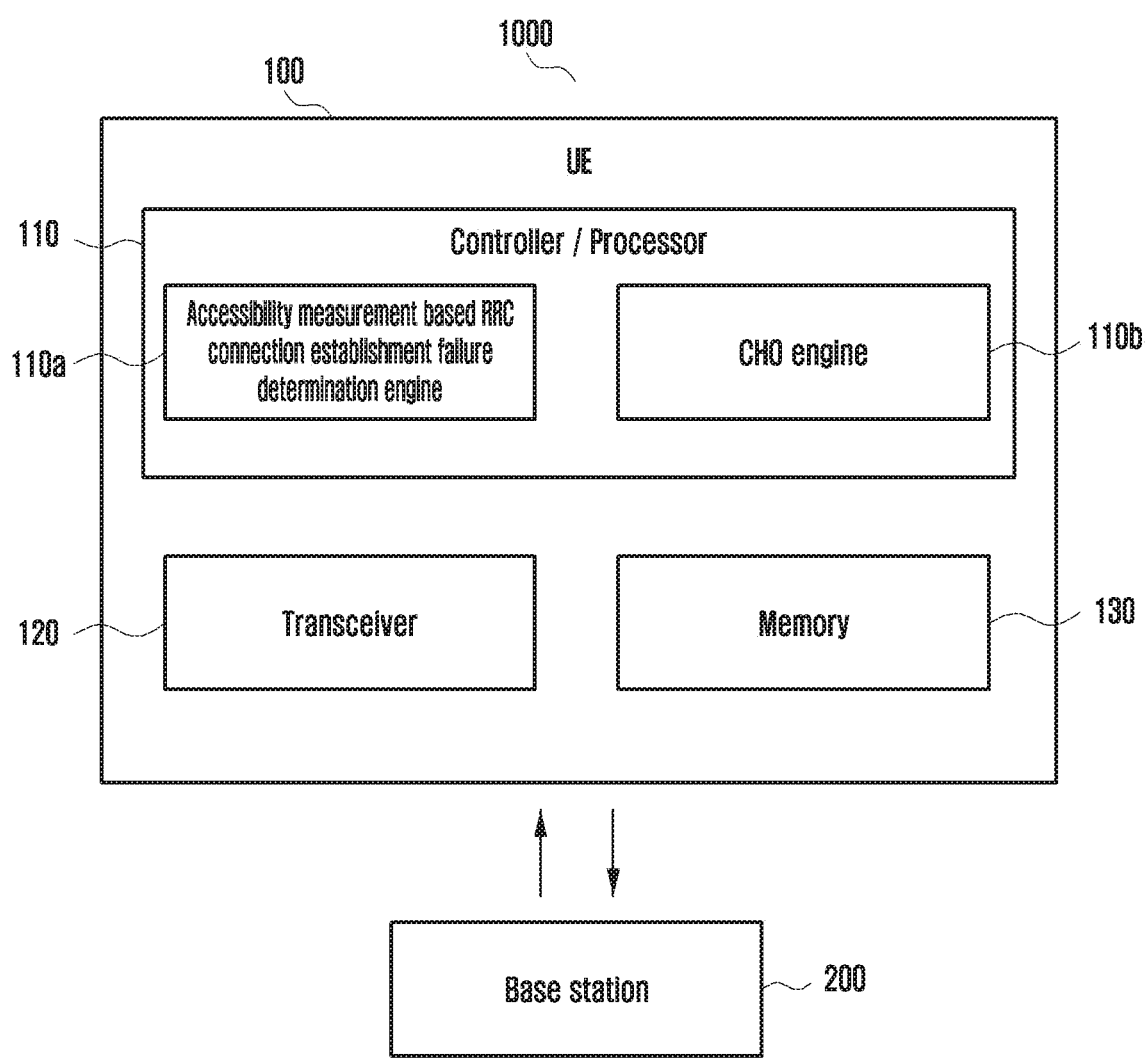
FIG. 1 is a schematic view of a wireless communication system for handling a conditional handover (CHO) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as managers, units, modules, hardware components or the like, are physically implemented by analog and/or digital circuits, such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports, such as printed circuit boards and the like. The circuits constituting a block may be implemented by dedicated hardware, or by a controller/processor (e.g., one or more programmed microprocessors and associated circuitry), or by a combination of dedicated hardware to perform some functions of the block and a controller/processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Fifth generation (5G) communication system (New Radio (NR)) is being developed in order to meet the growing need for broadband with an enhanced mobile broadband (eMBB) while also supporting new use cases like ultra-reliable low latency commination (URLLC) and massive machine type communication (mMTC). The NR is an Orthogonal frequency-division multiplexing (OFDM)-based air interface designed to support the wide variation of 5G device-types, services, deployments and spectrum. A base station (200) monitors the device behavior and provides the necessary resources to the UE (e.g., mobile phone, or the like) to perform any operation it requires (data—uplink or downlink, calls, or the like). The signal strength and quality experienced by the UE varies according to the proximity of the UE with the gNB. The UE's near the cell are expected to have a better signal condition compared to the ones which are far from the gNB i.e., cell edge situation.

Base station (200) RAN Node (i.e., a gNodeB) in the NR/eNB in the LTE always maintains a context on the UE that are in active RRC connection with it. At any point of time, the gNB can handover the UE from its control (i.e., a source cell) to another gNB or another cell (i.e., a target cell), thus transferring the entire context of the particular UE to the target cell. This decision is taken by base station (200) optionally based on assistance received from the UE, with the help of measurement reports about neighbor cells (i.e., a gNB configures the UE to measure the signal condition of the serving cell and neighboring cells that may belong to a different gNB). There is a specific measurement criteria, and a specific reporting criteria, both of which are configured by the serving gNB. Due to various reasons like weak signal condition, heavy load on serving gNB or the like, the serving gNB can handover the device to the neighbor cell or target gNB and this could be done based on assistance received from the UE in form of measurement reports.

The UE is continuously monitoring the quality of its radio link to ensure that the link is sufficiently in good conditions to successfully receive any transmission from the base station and to successfully make transmissions to the base station. When the UE identifies that that link quality has gone weak, the radio resource management (RRM) functionality performing radio link monitoring (RLM) at a PHY layer sends out of sync indications to the higher layers (i.e., an RRC layer) thereby indicating the higher layer about the degradation in radio link quality. Once the link degradation condition reaches the allowed limit, i.e., a configured threshold condition, the UE enters a state of outage, i.e., poor radio conditions where the UE experience Qout (out of sync indication from radio resource manager) due to high block error rate. The current specifications provision the use of a configured T310 timer in this state. The UE declares the radio link failure (RLF) on the expiry of this timer T310 and initiates cell selection procedure to attempt recovery.

In the basic handover in the NR (and LTE as well), the source node (i.e., eNB for LTE and gNB for NR) triggers handover by sending HO request to the target node and after receiving ACK from the target node, the source node initiates handover by sending HO command along with target cell configuration. The UE sends PRACH to the target cell after RRC reconfiguration is applied with the received target cell configuration. Work is ongoing in 3GPP to improve the interruption caused due to handover and to improve the reliability of handover. The proposed disclosure is related to enhancements to existing handover mechanisms in LTE and NR to improve interruption time and reliability during handover.

Thus, it is desired to address the above mentioned shortcomings or at least provide a useful alternative.

The terms the handover command and reconfiguration with synchronization are interchangeably used in the disclosure and both of these refer to the message that triggers handover execution procedure at the UE.

Accordingly, the embodiments herein disclose a method for executing a handover by a UE in a wireless communication system. The method includes receiving, by the UE, from a source cell a handover configuration comprising an execution condition associated with at least one candidate target cell from a plurality of candidate target cells and a configuration associated with the at least one candidate target cell from a plurality of candidate target cells. Further, the method includes evaluating, by the UE, the execution condition associated with the at least one candidate target cell. Further, the method includes determining, by the UE, that the execution condition is fulfilled for a target cell. Further, the method includes executing, by the UE, the handover towards the target cell based on the determination.

Unlike methods and systems of the related art, the method can be used to control an enhanced mobility in a LTE and a NR. The method can be used to initiate data forwarding in conditional handover based on indication from the UE. The method can be used to avoid duplicate handover command to the UE. The method can be used to configure CHO execution condition, so as to identify condition to stop transmission on source cell during an eMBB based handover.

The method can be used to indicate Beam ID in accessibility measurements in logged minimization of driving test (MDT). The method can be used to indicate UL carrier id in accessibility measurements in logged MDT. The method can be used to indicate from UE regarding the type(s) of make before break handover it supports. In the proposed methods, the base station (200) provisions to make before break handover based on one of the multiple handover types that are supported by the UE.

The proposed method can be used to reduce interruption time and improve reliability during handover even the UE is in existing handover mechanisms in LTE and NR systems.

The method can be used to correctly evaluate the resources used when the UE encountered connection establishment failure and UE needs to indicate the SSB which it selected to access the cell.

The method can be used to correctly evaluate the resources used when the UE encountered connection resume failure and UE needs to indicate the SSB which it selected to access the cell. The method can be used to correctly evaluate the resources used when the UE encountered connection establishment failure and UE needs to indicate the UL carrier it selected to access the cell. The method can be used to correctly evaluate the resources used when the UE encountered connection resume failure and UE needs to indicate the UL carrier it selected to access the cell.

In the proposed methods, the beam information (e.g., attempted beam index) can be indicated as part of RACH information. In other words, attempted SSB index can be indicated as part of RACH failure information.

In the proposed methods, SSB index of the downlink beams of both serving cell and neighbour cells and the corresponding measurement results and SUL/NUL carrier information should be included in the 5G NR RRC connection failure reporting.

Based on the proposed methods, the CHO configuration can have multiple triggering conditions provided to the UE. The CHO execution is performed if all (at most 2 conditions) conditions are satisfied by the UE. The UE combines multiple report configurations with either same or different events, to jointly evaluate the condition when both independent events are satisfied together. That is, the condition is considered as satisfied only if all the related events (conditions) are met.

Referring now to the drawings, and more particularly to FIGS. 1 through 8, where similar reference characters denote corresponding features consistently throughout the figures, there are shown preferred embodiments.

FIG. 1 is a schematic view of a wireless communication system for handling a CHO according to an embodiment of the disclosure.

Referring to FIG. 1, a wireless communication system (1000) includes a UE (100) and a base station (200). The UE (100) can be, for example but not limited to a cellular phone, a tablet, a smart phone, a laptop, a Personal Digital Assistant (PDA), a global positioning system, a multimedia device, a video device, an internet of things (IoT) device, a smart watch, a game console, a smart watch, a foldable display device, an Unmanned Aerial Vehicle (UAV), an airplane, or the like. The UE (100) may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like. The base station (200) may also be referred to as a base transceiver station, a radio base station, a radio transceiver, a transceiver function, a basic service set (BSS), an extended service set (ESS), an eNB, a gNB, or the like.

In an embodiment of the disclosure, the UE (100) includes a controller/processor (110), a transceiver (120), and a memory (130). The controller/processor (110) is coupled with the memory (130) and the transceiver (120). The controller/processor (110) includes a CHO engine (110*b*). The controller/processor (110) is configured to execute instructions stored in the memory (130) and to perform various processes. The transceiver (120) is configured for communicating internally between internal hardware components and with external devices via one or more networks.

The memory (130) stores instructions to be executed by the controller/processor 110. The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In some examples, the memory (130) can be configured to store larger amounts of information than the memory. In certain examples, a non-transitory storage medium may store data that can, over time, change (e.g., in Random Access Memory (RAM) or cache).

The accessibility measurement based RRC connection establishment failure determination engine (110*a*) is configured to detect a RRC connection failure and log parameters selected while attempting the failed RRC connection establishment. The logged parameters are referred as the accessibility measurement. In an embodiment of the disclosure, the RRC connection establishment failure is one of an RRC connection setup failure and an RRC connection resume failure.

Further, the accessibility measurement based RRC connection establishment failure determination engine (110*a*) is configured to indicate a presence of a connection establishment failure report to a base station (200) and receive a request corresponding to the connection establishment failure report from the base station (200). In an embodiment of the disclosure, the connection establishment failure report is one of a fifth generation new-radio radio resource control (5G NR RRC) setup failure report and a 5G NR RRC resume failure report.

In response to receiving request from the base station (200), the accessibility measurement based RRC connection establishment failure determination engine (110*a*) is configured to report the connection establishment failure report to the base station in the wireless communication system. The connection establishment failure report comprises the accessibility measurement, wherein the accessibility measurement includes at least one of a synchronization signal block (SSB) information selected during cell access and subsequently on which the UE (100) encountered the RRC connection establishment failure and a uplink carrier information selected during cell access and subsequently on which the UE (100) encountered the RRC connection establishment failure.

In an embodiment of the disclosure, the accessibility measurement enables the base station (200) to evaluate resources used by the UE (100) during the RRC connection establishment failure.

In an embodiment of the disclosure, the uplink carrier information is one of a Supplementary Uplink (SUL) carrier and a Normal Uplink (NUL) carrier, wherein the SUL carrier or the NUL carrier is selected during cell access and subsequently logged by the UE (100) upon encountering the RRC connection establishment failure.

In an embodiment of the disclosure, the SSB information comprises at least one of an SSB index, which is selected during cell access and subsequently logged by the UE (100) upon encountering the RRC connection establishment failure.

In an embodiment of the disclosure, the logged value of SSB index is included in the connection establishment report in response to receiving request from the base station (200)

In an embodiment of the disclosure, the logged value of uplink carrier information is included in the connection establishment failure report in response to receiving request from the base station (200).

In an embodiment of the disclosure, the CHO engine (110b) is configured to receive from a source cell a handover configuration comprising an execution condition associated with at least one candidate target cell from a plurality of candidate target cells and a configuration associated with the at least one candidate target cell from a plurality of candidate target cells.

In an embodiment of the disclosure, the execution condition includes a measurement identity linking a measurement object and one of a single report configuration or two report configurations.

In an embodiment of the disclosure, if the two report configurations are included in the execution condition then a first report configuration indicates a measurement event as one of a A3 event or a A5 event, and a trigger quantity as one of a Reference Signals Received Power (RSRP) or a Reference Signal Received Quality (RSRQ) or a signal-to-interference-plus-noise ratio (SINR), a second report configuration indicates a measurement event as one of a A3 event or a A5 event or a A4 event, and a trigger quantity as one of a RSRP or RSRQ or a SINR, and wherein the trigger quantity in the first report configuration is different from the trigger quantity in the second report configuration, wherein the reference signal type in the first report configuration and the reference signal type in the second report configuration is same.

Further, the CHO engine (110b) is configured to evaluate the execution condition associated with the at least one candidate target cell. In an embodiment of the disclosure, evaluate the execution condition associated with at least one candidate target cell comprises identify a fulfilment of an event indicated in a first report configuration and a fulfilment of an event indicated in a second report configuration.

Further, the CHO engine (110b) is configured to determine that the execution condition is fulfilled for a target cell from the plurality of candidate target cells. In an embodiment of the disclosure, determine that the execution condition is fulfilled for the target cell comprises indicate a joint fulfilment of events in the first report configuration and the second report configuration.

Further, the CHO engine (110b) is configured to execute the handover towards the target cell based on the determination. In an embodiment of the disclosure, execute the handover towards the candidate target cell is performed upon selecting the target cell from the plurality of candidate target cells for which joint fulfillment of events is determined and applying from the received handover configuration the target cell configuration associated with the selected target cell.

Although the FIG. 1 shows various hardware components of the wireless communication system (1000) but it is to be understood that other embodiments are not limited thereon. In other embodiments of the disclosure, the wireless communication system (1000) may include less or more number of components. Further, the labels or names of the components are used only for illustrative purpose and does not limit the scope of the disclosure. One or more components can be combined together to perform same or substantially similar function to handle the CHO in the wireless communication system (1000).

Figure 2A:
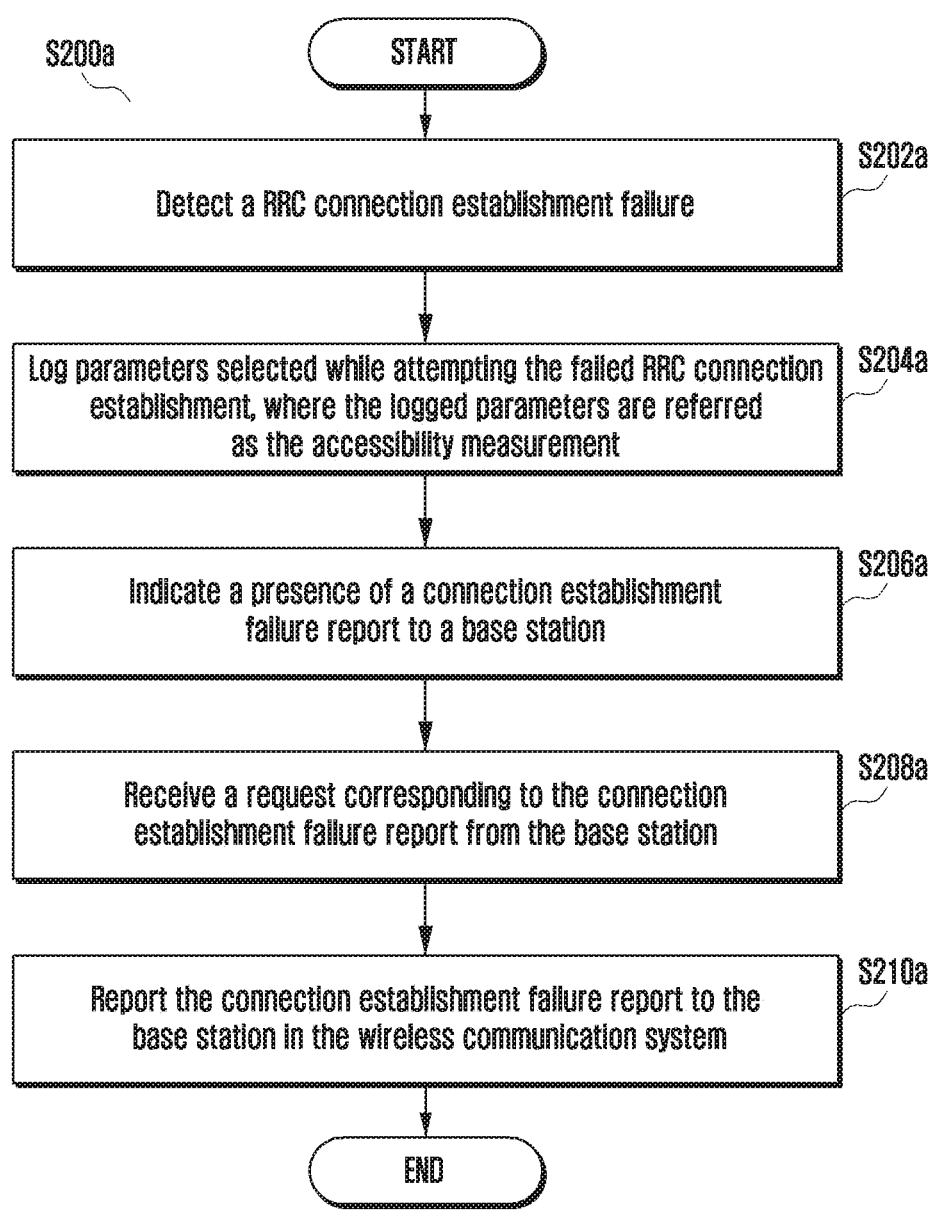
FIG. 2A is a flowchart illustrating a method for reporting accessibility measurement based on a radio resource control (RRC) connection establishment failure in a wireless communication system according to an embodiment of the disclosure.

FIG. 2A is a flowchart illustrating a method for reporting an accessibility measurement based on an RRC connection establishment failure in a wireless communication system according to an embodiment of the disclosure. The operations (S202a to S210a) are performed by the controller/processor (110).

Referring to FIG. 2A, at operation 202a, the method includes detecting the RRC connection establishment failure. At operation 204a, the method includes logging parameters selected while attempting the failed RRC connection establishment, wherein the logged parameters are referred as the accessibility measurement.

At operation 206a, the method includes indicating a presence of a connection establishment failure report to the base station (200). At operation 208a, the method includes receiving the request corresponding to the connection establishment failure report from the base station (200).

At operation 210a, the method includes reporting the connection establishment failure report to the base station (200) in the wireless communication system (1000) in response to receiving request from the base station (200). The connection establishment failure report comprises the accessibility measurement, wherein the accessibility measurement comprises at least one of a synchronization signal block (SSB) information selected during cell access and subsequently on which the UE (10) encountered the RRC connection establishment failure and a uplink carrier information selected during cell access and subsequently on which the UE (100) encountered the RRC connection establishment failure.

Figure 2B:
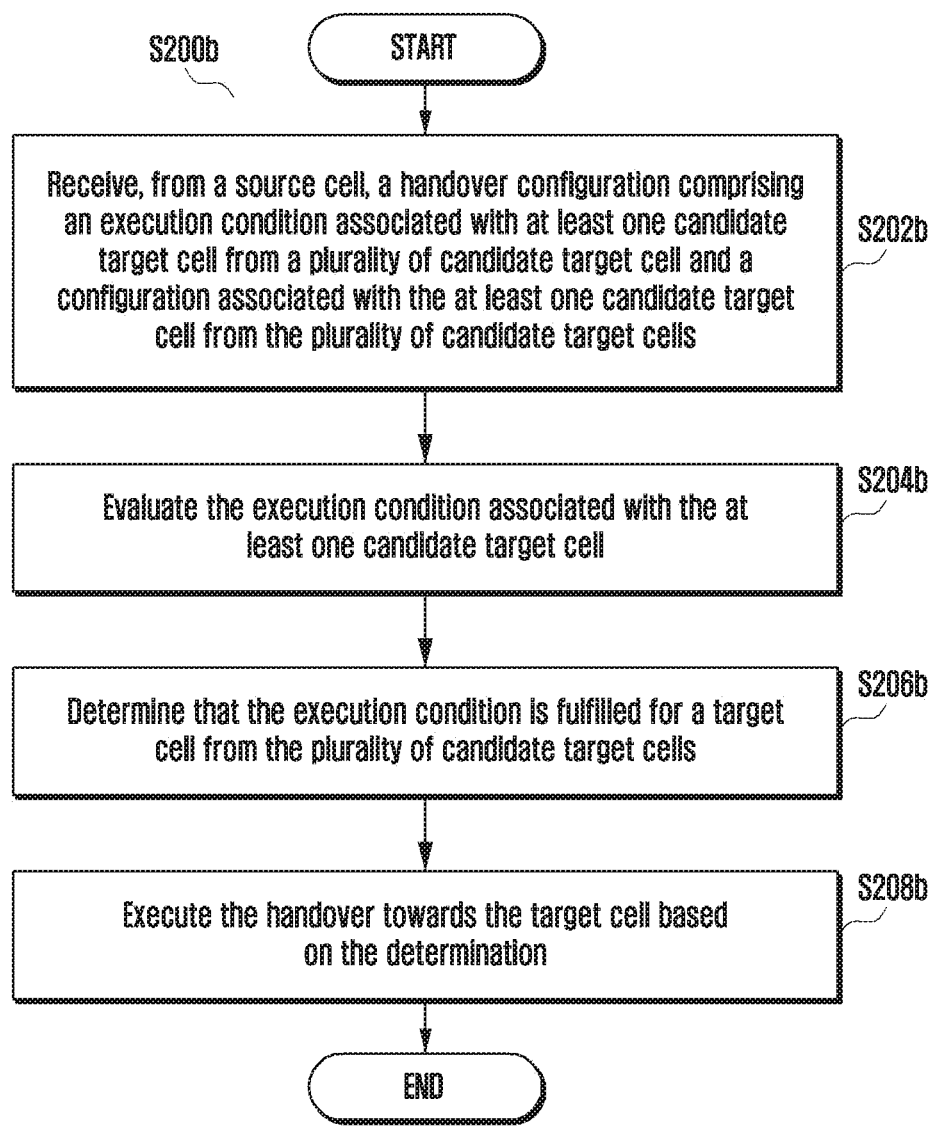
FIG. 2B is a flowchart illustrating a method for executing the handover in a wireless communication system according to an embodiment of the disclosure.

FIG. 2B is a flowchart illustrating a method for handling a handover in a wireless communication system according to an embodiment of the disclosure. The operations (S202b to S208b) are performed by the controller/processor (110).

Referring to FIG. 2B, at operation S202b, the method includes receiving from the source cell the handover configuration comprising the execution condition associated with the at least one candidate target cell and the configuration associated with the at least one candidate target cell. At operation S204b, the method includes evaluating the execution condition associated with the at least one candidate target cell. At operation S206b, the method includes determining that the execution condition is fulfilled for the target cell from the plurality of candidate target cell. At operation S208b, the method includes executing the handover towards the target cell based on the determination.

Figure 3A:
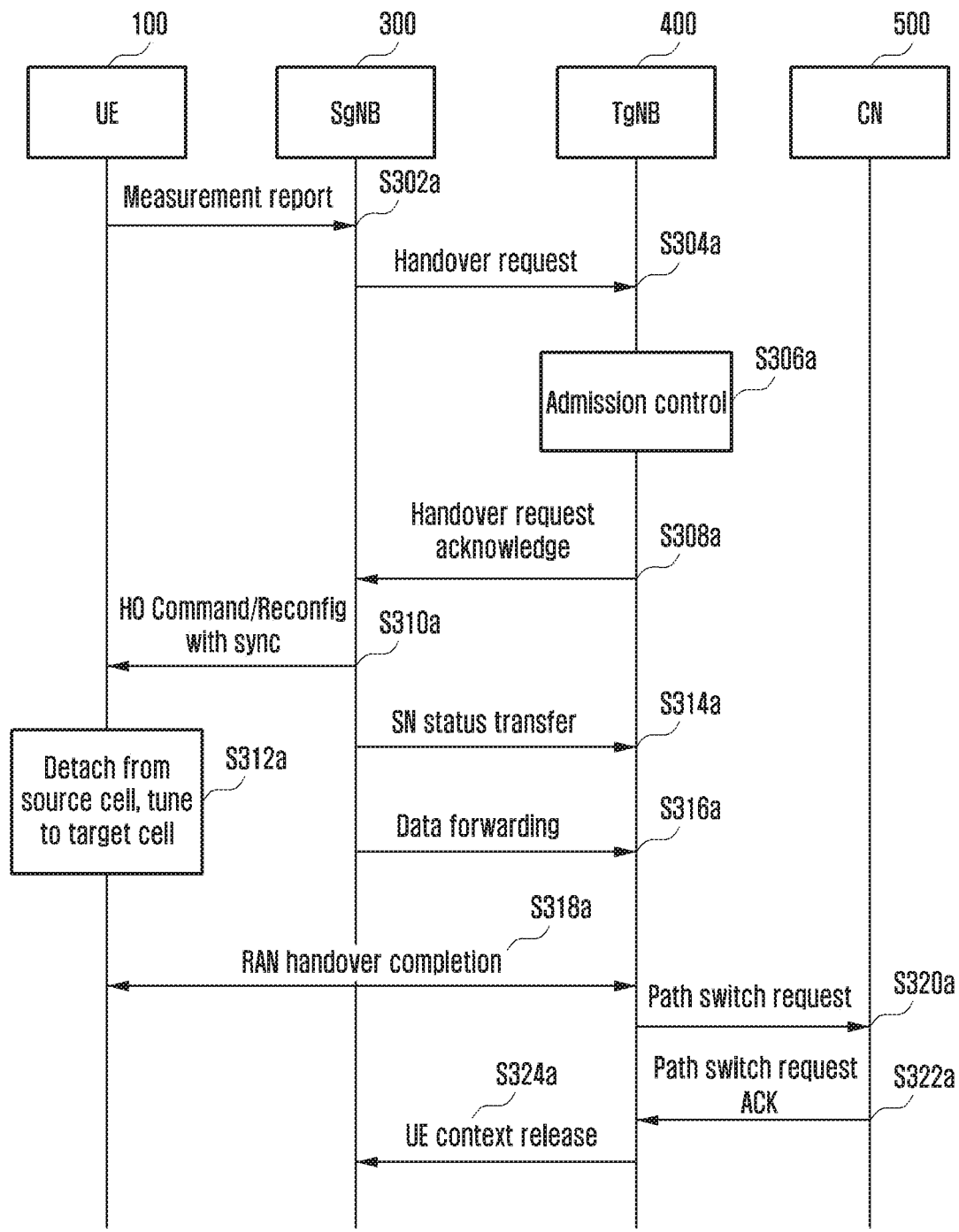
FIG. 3A illustrates a sequence diagram in which a simplified model of release 15 (Rel-15) handover is depicted according to current Rel-15 specifications according to an embodiment of the disclosure.

FIG. 3A illustrates a sequence diagram in which a simplified model of release 15 handover is depicted according to an embodiment of the disclosure.

Referring to FIG. 3A, during the mobility procedures currently available in normal LTE HO and NR Release 15 specifications, on receiving handover command (or reconfiguration with sync) from the base station (200), the UE (100) suspends operation on the source eNB/gNB, tunes to the target frequency (i.e., a DL synchronization) and performs random access on the target cell. After random access is successfully completed on the target cell, data exchange is resumed with the target cell. There is a visible interruption between suspending operation on source eNB/gNB and resuming operation on the target eNB/gNB. Moreover, the existing handover model relies on the measurement report that the UE (100) sends to the base station (200), making the base station (200) aware that the source cell is weak and one or more neighbor cell(s) that is better than the source cell. The RF and coverage planning for the base station (200) is done in such a way that the neighbor cells have minimum overlap in the cell edges. The overlap is sufficient to aid the handover between these cells and not create significant interference between transmissions from the cells. They are provisioned to provide this form of coverage footprint to reduce deployment cost as well. As a result, the area referred as handover region where the UE (100) identifies that the neighbor cell has become stronger than the current serving cell is based on trigger condition, referred as measurement event. The UE (100) triggers the measurement report and sends to the source eNB/gNB when the measurement event is triggered. The source node now prepares one or more target cell(s) indicated in the measurement report for the handover. Once admission control for the UE (100) is completed on the potential target node, handover acknowledgement is provided to the source cell. The source cell decides the target cell and provides the handover command to the UE (100) with the necessary configuration to access the target cell.

At time, the base station (200) takes to prepare the target cell for handover, may be longer than the time the UE (100) can sustain connection with the source cell. This leads to a case where the UE (100) does not successfully receive the handover command from the source cell due to further degraded signal condition. This is especially common in high mobility scenarios or if the handover region suffers from high interference. As a result, in release 16, both LTE and NR is introducing a new handover model where the target cell is prepared for handover in advance and the UE (100) can autonomously execute handover to the target cell based on condition(s) provided by the base station (200). This model of handover is referred to as conditional handover. Due to departure from traditional handover model which is under complete base station control, conditional handover which is under partial base station control demands certain changes as compared to traditional handover.

In an embodiment of the disclosure, the method can be used to initiate data forwarding in the conditional handover based on indication from the UE (100). Once admission control is successful at the target node, the UE (100) sends handover acknowledgement to the source node. During this time, the user plane connection to core network (500) (i.e., a path switch) is at the source node and has not been switched to the target node. The path switch from the source cell to the target cell can be done only on successful completion of handover to the target cell. The source node now sends SN transfer status to the target node to make it aware of the sequence number (SN) it has to apply for its transmissions in downlink (DL) and uplink (UL) and performs data forwarding. The data forwarding is the process of forwarding all pending packets from the source node to the target node. This is done because the source cell stops communication with the UE (100) as soon as the source cell receives the handover acknowledgement from the target cell and sends handover command (reconfiguration with sync) to the UE (100). The forwarded packets are then transferred to the UE (100) via the target cell once handover is successful, i.e., upon successful completion of random access in the target cell.

In Release 15 handover, based on the measurement report received from the UE (100), typically the source decides the target cell from the one or more target cell(s) reported by the UE (100). There may be only one target cell that is prepared for handover by the source cell. Therefore, as soon as handover acknowledgement is received from the target cell, data forwarding and SN status transfer to target can be performed. However, in conditional handover, since the UE (100) evaluates the handover condition at a later stage and it is not known which the target cell meets the handover condition, there can be multiple cells that are prepared for a potential handover of the UE (100). Multiple target cells are prepared, as the source cell cannot accurately predict the target cell to which the UE (100) may have to perform handover to, in advance. Performing SN status transfer and data forwarding to all of the prepared cells introduces a heavy load on the X2 interface of the base station (200) and consequently huge resource wastage. Therefore, it is imperative that the traditional timing and trigger for data forwarding from source node to the target node, as soon as target cell is prepared for handover cannot be adopted in conditional handover.

A new trigger condition for data forwarding in conditional handover (CHO) then needs to be defined. In CHO, the target cell configuration is sent to the UE (100) in advance and the actual handover execution is performed at a later point in time when the handover condition is met, i.e., measurement event is triggered. The handover execution to the target cell is controlled by means of a condition that is configured to the UE (100) along with CHO configuration.

In this method, when the condition for execution of the CHO is satisfied, the UE (100) sends an indication to the source cell. In theory, a measurement object involving the serving cell and the target cell evaluation (like event A3, event A5) is used to assist the base station (200) in initiating handover of the UE (100) to the neighbor cell. It serves as a mechanism to indicate to the base station (200) that the UE (100) is leaving its coverage area and approaching the coverage area of the neighbor cell. In order to facilitate conditional handover, the measurement report is not required to be sent to the source cell as the target cell is already prepared for handover. However, it is required to inform the source cell about the target cell to which the UE (100) is executing handover to. This will allow the source cell to trigger SN transfer status and data forwarding only to that target cell, and the forwarded data is already available at the target cell when the UE (100) successfully completes random access to the target cell. Therefore, in this mechanism, data forwarding is performed only to one target cell thereby avoiding resource wastage on X2 interface and allows less interruption time during handover as the target cell already has data to be forwarded to the UE (100) when it successfully accesses the target cell. In an embodiment of the disclosure, the UE (100) reports to the source cell, the measurement report that triggers execution of CHO to the target cell. In an embodiment of the disclosure, the UE (100) indicates the target cell identifier for which the CHO execution is trigger. The target cell identifier is one of the physical cell identifier (PCI) and DL-ARFCN (i.e., DL frequency) of the target cell or the Global cell identifier and DL-Absolute Radio Frequency Channel Number (ARFCN) of the target cell. This information regarding the target cell can be indicated in the measurement report along with measurement results or in any other new RRC message.

In traditional base station (200) controlled HO, most handover failure cases occur due to UE (100) not receiving handover commands on time. The delay from sending measurement report with neighbor cell details to the base station (200), and receiving handover command with the target cell configuration from the base station (200) is caused due to time taken in preparing the target cell for handover. By the time the target cell is successfully prepared for handover, the source cell signal conditions may degrade further making it improbable for the UE (100) to receive downlink transmissions successfully. However, the probability of receiving measurement report from the UE (100) indicating the measurement results for one or more neighbor cell(s) is high compared to the probability of receiving the handover command from the source when the target cell is prepared. The measurement condition configured to trigger the CHO execution is expected to have similar configuration as the measurement report used in the traditional handover to indicate the source cell about the UE (100) moving towards a neighbor cell. Therefore, the probability of successfully receiving the measurement report by the source node is high. The reception of measurement report by the source node serves as a trigger to initiate data forwarding to the target cell that is indicated in the measurement report.

Referring to FIG. 3A, at operation S302a, the UE (100) sends the measurement report to an SgNB (300). At operation S304a, based on the measurement report, the SgNB (300) sends the handover request to the TgNB (400). Based on the handover request, at operation S306a, the TgNB (400) performs the admission control procedure. Based on the admission control procedure, at operation S308a, the TgNB (400) sends the handover request acknowledge message to the SgNB (300). After receiving the handover request acknowledge message from the TgNB (400), at operation S310a, the SgNB (300) sends the HO Command/Reconfig with sync message to the UE (100). Based on the HO Command/Reconfig with sync message, at operation S312a, the UE (100) detaches from the source cell and tune to target cell. At operation S314a, the SgNB (300) sends the SN status transfer message to the TgNB (400) and at operation S316a, the SgNB (300) sends the data forwarding to the TgNB (400). At operation S318a, the RAN handover completion is occurred between the UE (100) and the TgNB (400). At operation S320a, the TgNB (400) sends the path switch request to the CN (500). At operation S322a, the CN (500) sends the path switch request acknowledge message to the TgNB (400). At operation S324a, the TgNB (400) sends the UE context release to the SgNB (300).

Figure 3B:
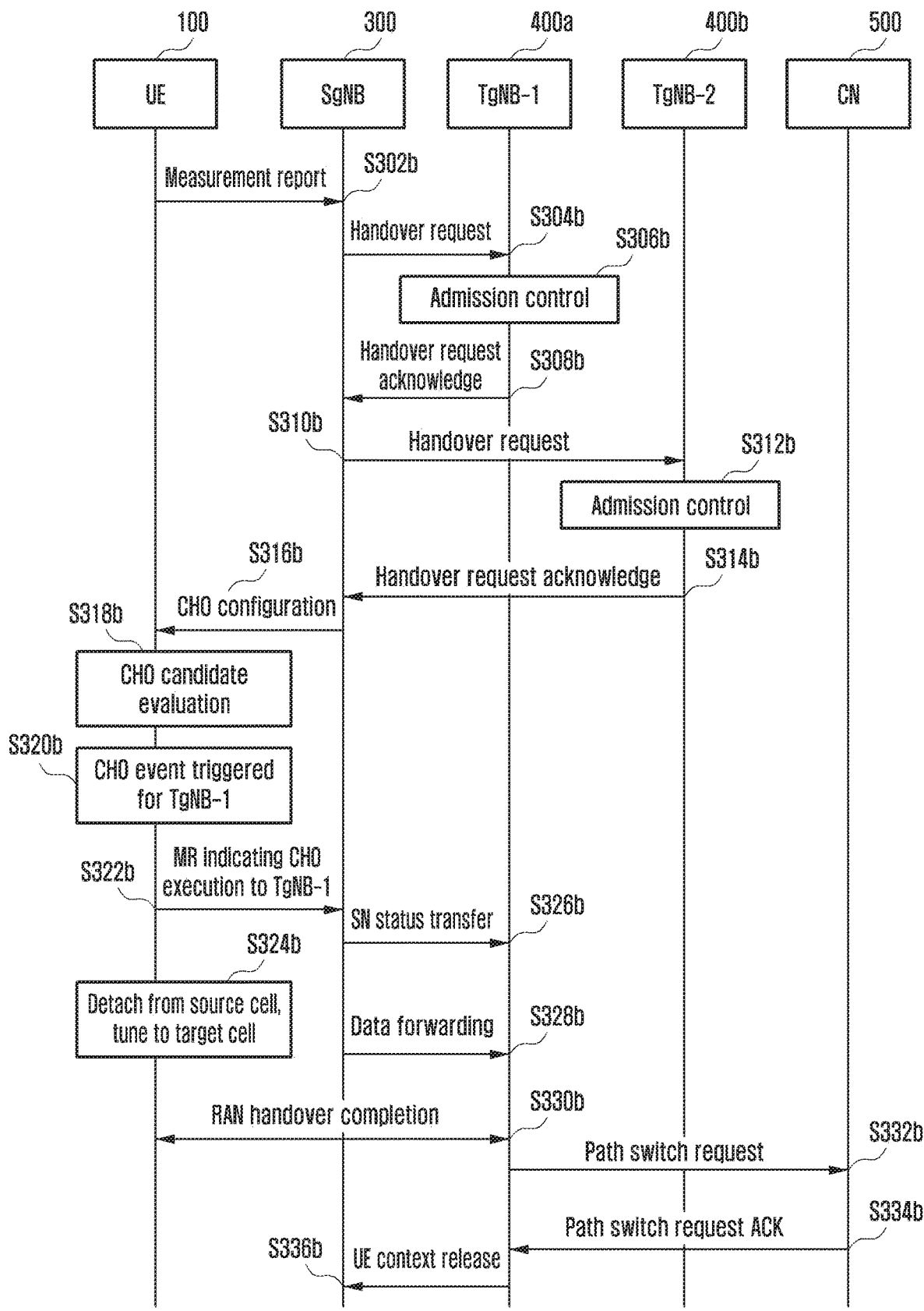
FIG. 3B illustrates a sequence diagram in which a source cell initiates transmission of sequence number (SN) status transfer and data forwarding to a target cell indicated in a measurement report that triggers CHO execution at a user equipment (UE) according to an embodiment of the disclosure.

FIG. 3B illustrates a sequence diagram in which the source cell initiates transmission of SN status transfer and data forwarding to a target cell indicated in a measurement report that triggers CHO execution at the UE according to an embodiment of the disclosure.

Referring to FIG. 3B, in another embodiment of the disclosure, the source cell initiates transmission of SN status transfer and data forwarding to the target cell indicated in the measurement report that triggers CHO execution at the UE (100).

Once condition to execute CHO is satisfied, the measurement report is sent by the UE (100) to the source indicating the target cell identifier. The measurement report is sent using RLC AM, so there is RLC ACK from the source cell if it successfully received the measurement report. When the UE (100) receives the RLC ACK it performs handover related actions (i.e., HO execution) and tunes to the target cell frequency (i.e., DL synchronization). This may involve suspending transmit/receive operation on the source cell depending on the handover type—for handovers that does not support simultaneous connectivity with the source cell and the target cell. For handovers (i.e., make-before-break type HO) that allow continuing activity on the source cell even after handover execution is triggered the UE (100) does not suspend transmit/receive operation on the source cell while it tunes to the target cell frequency. In order to ensure that the data forwarding to target cell is initiated by the source cell, the UE (100) may wait until it receives layer 2 acknowledgement (i.e., RLC ACK) from the source cell for the measurement report it has sent. Therefore, in another embodiment of the disclosure, the UE (100) waits for L2 ACK (i.e., RLC ACK) for the transmitted measurement report prior to suspending operation on the source cell or initiating HO execution towards the target cell.

There is possibility that by the time L2 ACK (i.e., RLC ACK) is received by the UE (100), the signal conditions have degraded and the UE (100) is unable to successfully decode Physical Downlink Shared Channel (PDSCH). For handling such cases, a timer (predefined or configurable) may be used. The timer is started on sending the measurement report that triggers the CHO execution to the base station (200). The timer is stopped on receiving L2 ACK for the measurement report. When the timer is expired, the UE (100) stops monitoring the source cell for L2 ACK and attempts for handover on the target cell, i.e., HO execution on the target cell is triggered.

Under cases where the signal condition may degrade at a very fast rate (e.g., deep fading in higher frequency ranges), it is possible that the measurement report sent to the source cell is not successfully received. However, the UE (100) may proceed with CHO to the target cell upon the CHO condition is satisfied and the timer to receive RLC ACK is expired. In such cases, when the UE (100) completes successful random access in the target cell and the target cell determines that data forwarding path is not established/SN status transfer is not received from the source cell, the target cell can request the source cell for SN status transfer and data forwarding. In an embodiment of the disclosure, the target cell requests the source cell for SN status transfer and data forwarding, if it is not initiated by the source cell by the time when the UE (100) successful completes random access on the target cell.

At operation S302b, the UE (100) sends the measurement report (MR) to the SgNB (300). At operation S304b, based on the measurement report, the SgNB (300) sends the handover request to the TgNB1 (400a). Based on the handover request, at operation S306b, the TgNB1 (400a) performs the admission control procedure. Based on the admission control procedure, at operation S308b, the TgNB1 (400a) sends the handover request acknowledge message to the SgNB (300).

After receiving the handover request acknowledge message from the TgNB1 (400a), at operation S310b, the SgNB (300) sends the handover request to the TgNB2 (400b). Based on the handover request, at operation S312b, the TgNB2 (400b) performs the admission control procedure. Based on the admission control procedure, at operation S314b, the TgNB2 (400b) sends the handover request acknowledge message to the SgNB (300).

At operation S316b, the SgNB (300) sends the CHO configuration to the UE (100). At operation S318b, the UE (100) performs the CHO candidate evaluation and at operation S320b, the UE (100) performs the CHO event triggered for TgNB1 (400a). At operation S322b, the UE (100) specifies the MR indicating CHO execution to TgNB1 (400a). At operation 324b, the UE (100) detaches from the source cell and tune to target cell. At operation S326b, the SgNB (300) sends the SN status transfer message to the TgNB1 (400a) and at operation 328b, the SgNB (300) sends the data forwarding to the TgNB1 (400a). At operation 330b, the RAN handover completion is occurred between the UE (100) and the TgNB (400a). At operation S332b, the TgNB1 (400a) sends the path switch request to the CN (500). At operation S334b, the CN (500) sends the path switch request acknowledge message to the TgNB (400). At operation S336b, the TgNB1 (400a) sends the UE context release to the SgNB (300).

Figure 4A:
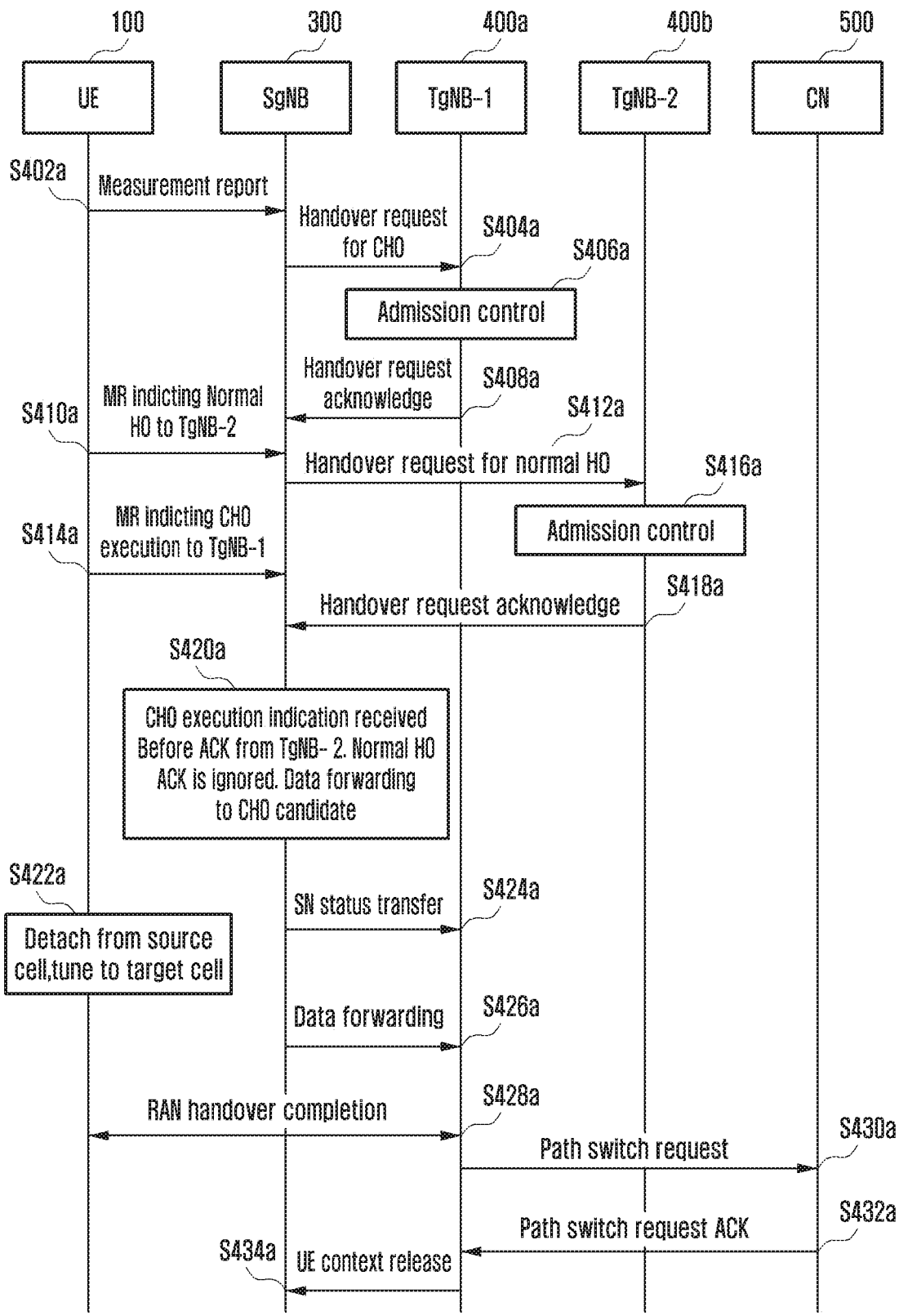
FIG. 4A illustrates sequence diagram in which a source cell ignores a handover ACK received for normal handover preparation if it has already received measurement report from a UE indicating CHO execution according to an embodiment of the disclosure.

FIG. 4A illustrates a sequence diagram in which a source cell ignores a handover ACK received for normal handover preparation if it has already received measurement report from a UE indicating CHO execution according to an embodiment of the disclosure.

Referring to FIG. 4A, in an embodiment of the disclosure, the method can be used to avoid duplicate handover command to the UE (100). In CHO, the UE (100) is preconfigured with potential candidate cells for handover. However, it is possible that the UE mobility is towards other neighbor cells which are not part of the CHO candidates. In such cases, the base station (200) configures a regular handover based on measurement report from the UE (100). This handover command has higher priority than CHO configuration received and therefore takes precedence if the CHO condition is not triggered.

In another scenario, it is possible that the UE (100) sends the measurement report for a neighbor cell which is not a CHO candidate (e.g., TgNB-2 in the FIG. 4A). The neighbor cell (TgNB-2) is prepared for handover and handover ACK is sent to the source cell. It is possible that during the HO preparation phase for TgNB-2, the UE (100) satisfies the condition for CHO execution for a candidate cell in the CHO configuration (TgNB-1 in the FIG. 4A) and sends the related measurement report to the source cell. At this point, the source cell has 2 target cells prepared for handover—one is the target cell (TgNB-2) based on normal handover preparation and other is the target cell (TgNB-1) based on CHO preparation. However, the source cell has not yet received the HO Request ACK from TgNB-2 when it receives the measurement report for TgNB-1. The UE (100) can perform handover only to one of them and it is imperative that the source cell performs the SN status transfer and data forwarding to the same target cell that the UE (100) attempts handover to (i.e., TgNB-1). In an embodiment of the disclosure, the source cell ignores the handover ACK received for normal handover preparation if it has already received measurement report from the UE indicating CHO execution as illustrated in FIG. 4A.

At operation S402a, the UE (100) sends the measurement report to the SgNB (300). At operation S404a, based on the measurement report, the SgNB (300) sends the handover request for the CHO to the TgNB1 (400a). Based on the handover request, at operation S406a, the TgNB1 (400a) performs the admission control procedure. Based on the admission control procedure, at operation S408a, the TgNB1 (400a) sends the handover request acknowledge message to the SgNB (300).

At operation S410a, the UE (100) sends the MR indicating normal HO to TgNB-2 (400b). At operation 412a, the SgNB (300) sends the handover request for normal HO to the TgNB2 (400b). At operation 414a, the UE (100) sends the MR indicating CHO execution to TgNB1 (400a). Based on the handover request, at operation 416b, the TgNB2 (400b) performs the admission control procedure. Based on the admission control procedure, at operation S418b, the TgNB2 (400b) sends the handover request acknowledge message to the SgNB (300). At operation S420a, the SgNB (300) performs the CHO execution indication received before ACK from TgNB-2, normal HO ACK is ignored, and data forwarding to CHO candidate.

At operation S422a, the UE (100) detaches from the source cell and tune to the target cell. At operation S424a, the SgNB (300) sends the SN status transfer message to the TgNB1 (400a) and at operation S426a, the SgNB (300) sends the data forwarding to the TgNB1 (400a). At operation S428a, the RAN handover completion is occurred between the UE (100) and the TgNB1 (400a). At operation S430a, the TgNB1 (400a) sends the path switch request to the CN (500). At operation S432a, the CN (500) sends the path switch request acknowledge message to the TgNB1 (400a). At operation S434a, the TgNB1 (400a) sends the UE context release to the SgNB (300).

Figure 4B:
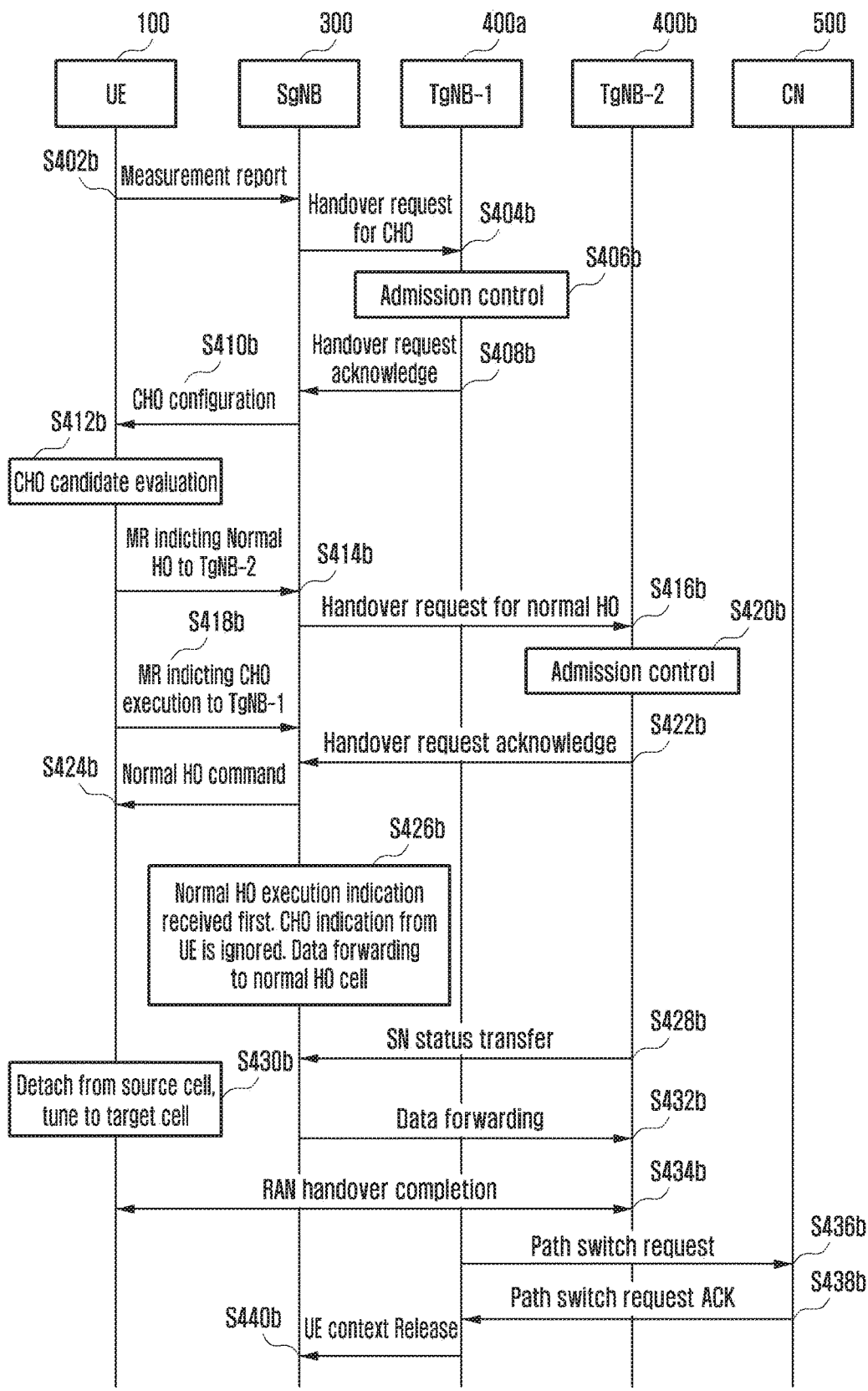
FIG. 4B illustrates a sequence diagram in which a UE cancels a CHO execution and performs normal HO execution if normal HO command is received from a source cell prior to receiving L2 ACK or HARQ ACK for CHO measurement report transmission according to an embodiment of the disclosure.

FIG. 4B illustrates a sequence diagram in which a UE cancels a CHO execution and performs a normal HO execution if normal HO command is received from a source cell prior to receiving L2 ACK or HARQ ACK for CHO measurement report transmission according to an embodiment of the disclosure.

Referring to FIG. 4B, similarly, it is possible that the UE (100) sends the CHO triggering measurement report to the base station (200) and by then, HO command for a normal handover is received at the UE (100). In another scenario, it is possible that the UE (100) sends the measurement report for a neighbor cell which is not a CHO candidate (e.g., TgNB-2 in the FIG. 4B). The neighbor cell (TgNB-2) is prepared for handover and handover ACK is sent to the source cell. It is possible that upon completion of the HO preparation phase for the TgNB-2, the UE (100) satisfies the condition for CHO execution for a candidate cell in the CHO configuration (TgNB-1 in the FIG. 4B) and the UE (100) sends the related measurement report to the source cell. At this point, the source cell has 2 target cells prepared for handover—one is the target cell (TgNB-2) based on normal handover preparation and other is the target cell (TgNB-1) based on CHO preparation. However, the source has received the HO Request ACK from TgNB-2 before it receives the measurement report for TgNB-1. The UE (100) can perform handover only to one of them and it is imperative that the source cell performs SN status transfer and data forwarding to the same target cell that the UE attempts handover to (i.e., TgNB-2).

In an embodiment of the disclosure, the UE (100) cancels the CHO execution and performs the normal HO execution if normal HO command is received from the source cell prior to receiving L2 ACK (i.e., RLC ACK) or HARQ ACK for CHO measurement report transmission as illustrated in FIG. 4B. As a corollary, once handover execution detail is received at the source cell i.e., measurement report for CHO or HO preparation ACK for normal HO, the source node processes the first message it receives and ignores the message that arrives later. As a result, if the UE (100) receives HO command after transmission of CHO MR (before L2 ACK of CHO MR), then the UE (100) shall execute normal handover. This is done because the UE (100) should be aware that the source cell provided normal HO command as this arrived at the source cell earlier in time than the CHO triggering measurement report. Therefore, data forwarding is initiated by source cell to the target cell for which handover indication is received earliest at the source cell.

In an embodiment of the disclosure, the method can be used to configure CHO execution condition. The UE (100) reports the event A1 only when serving cell signal condition is good i.e., A1 is reported when serving cell signal condition is better than a network configured threshold. The base station (200) (i.e., source gNB) on receiving event A1 from the UE (100) may reconfigure/add/remove other measurement ids, for example to configure A2 to identify when the signal condition of the UE starts degrading below a configured value. Therefore, A1 event is not suitable to trigger a handover to a neighbor cell.

The UE (100) reports Event A2 only when serving cell signal condition is poor and does not indicate to the base station (200) about a potential neighbor cell that is under good signal conditions i.e., A2 is reported when serving cell signal condition is weaker than a network configured threshold. The source gNB on receiving the event A2 may either reconfigure/add/remove a measurement id, for example source gNB configures A1 to identify when the UE signal conditions improve or configures A3/A5 to identify if the neighbor cell is in suitable signal conditions to serve the UE (100). Alternatively, the source gNB may perform blind preparation of the target cell and provide the handover command to the UE. However, this does not guarantee a good handover success rate as the UE vicinity to these neighbor cells is not known to the source gNB. Event A2 based blind handovers may be useful only in cases where there are two collocated cells, one belonging to low frequency and other belonging to high frequency, and the coverage of these cells are overlapping and overlaying. In these cases, the UE (100) connected to higher frequency cell may be handed over to the cell operating on lower frequency without the knowledge of the signal condition of the target cell (cell on lower frequency has larger coverage footprint). This is a very limited scenario and may not be applied extensively in practical deployments. Although, the event A2 can be used to trigger handover, the event A2 alone cannot be used to perform a reliable handover.

The UE (100) reports the event A4 only when the neighbor cell signal condition is good i.e., A4 is reported when neighbor cell signal condition is better than a network configured threshold. The source gNB on receiving the event A4 may reconfigure/add/remove other measurement ids, for example, the source gNB configures Event A3/A5 to understand the neighbor cell signal conditions in comparison to the serving cell signal conditions. Alternatively, the source gNB may provide handover command to the UE (100) to the neighbor cell reported in Event A4. Although the handover to the target cell may be successful due to good signal condition of the target cell, it does not ensure that the target cell is better than the source cell. It is possible that signal condition and QoS provided by the target cell are poor as compared to source cell. Although, the event A4 can be used to trigger handover, Event A4 alone cannot be used to perform a reliable handover.

In order to provision a reliable handover to the neighbor cell, the source gNB should be aware that a neighbor cell can provide better service to the UE (100) than the current serving cell. Events A3 and A5 provides both the serving cell and neighbor cell signal conditions to the base station (200). A3 is reported when a neighbor cell signal condition is better than the serving cell by at least a configured offset. A5 is reported when the serving cell signal condition is weaker than a configured threshold value and neighbor cell signal condition is better than another network configured threshold value. Therefore, the source gNB is in a position to understand if the neighbor cell can provide better service. However, in some cases, more than one events are needed for triggering handover reliably.

In traditional handover, the base station (200) configures several measurement events to the UE (100). It is not necessary that the base station (200) prepares the target cell based on each relevant measurement report from the UE (100). The base station (200) may take decision of providing handover command to the UE (100) based on multiple measurement report or the sequence of measurement report from the UE (100). It is also possible for the source node to be aware of the load condition of the neighbor node/target node. The target cell may be prepared for handover only if load conditions are within acceptable levels even if measurement results indicate that the neighbor cell is under better signal conditions. As a consequence, sometimes handover is not provided to the best cell reported to the base station (200) in measurement report.

However, in case of conditional handover, the condition for executing the handover is configured to the UE (100) and the UE (100) autonomously executes handover based on this condition. Therefore, the CHO is under partial base station (200) control. There is no intelligence at the UE (100) when it executes the CHO towards the target unlike that of base station (200) in traditional handover, the base station (200) judiciously decides the handover of the UE (100) to the neighbor target cell based on such the base station (200) intelligence e.g., load condition of target. In traditional handover, the serving cell provides handover command to the UE (100) if the neighbor signal conditions are good, and the load of the neighbor cell is acceptable to serve the additional UE (100). However, in conditional handover, the condition to trigger CHO execution is provided much earlier in time. It is possible that during this time, the target cell load was low enough to allow for more UEs (100) to access the cell. However, the actual CHO execution happens at a later time and by then the load on the target cell may have changed. However, when the CHO triggers and the UE (100) executes handover to the target cell, the load in the target has increased. In such scenario the service provided on that target cell may be worse/weaker than that on the source cell.

In order to overcome this, it is necessary to instill the UE (100) with some intelligence in decision making towards CHO execution. This can be done by introducing the requirement for satisfying multiple reporting configurations by the UE (100). For example, the UE (100) may be configured with event A3 with trigger quantity set to RSRP. When A3 is successfully satisfied by the UE (100), it is aware that the signal strength of the neighbor cell is better than the serving cell/suitable to serve the UE (100). However, it is not aware of the load and quality of the neighbor cell. To make the UE (100) capable of making an intelligent evaluation of the target cell, the base station (200) can configure event A4 with trigger quantity set to RSRQ. The RSRQ measurement provides an indication of the load on the target cell. Together, the RSRP based A3 indicates that the target cell signal conditions are good and RSRQ based A4 indicates the load on the target cell is acceptable. Therefore, the handover is made more reliable than the case of the CHO execution based on single condition/trigger.

In another example, in a regular handover, the source cell has several options to decide on handover (based on different reporting configurations and different trigger quantities).

A UE assisted handover based on A3/A5 where the stronger neighbor is indicated in the MR, or A UE assisted handover based on A4 where neighbor is indicated in MR. However, the source cell may be in sustainable signal conditions (or the entry condition of A3/A5 may not be satisfied).

Blind HO based on A2 where neighbor is not indicated in the MR.

UE assisted handover based on multiple or sequence of measurement reports from the UE (100) (for different reporting configurations)

To manage and assist in HO decision, the source cell may configure multiple measurement report configurations for the same MO and eventually take decision based on the MR it receives from the UE (100). The MR does not always have to be A3/A5 but can also be A2/A4. In the above example, Beam Failure Recovery (BFR) was indicated as one of the possible outcomes of sudden degradation of the cell (in FR2). The typical values of time-to-trigger (TTT) configured in LTE deployments used to vary between 256 ms to 1024 ms. If BFR is triggered due to sudden drop in beam quality in mobility scenarios, considering that PRACH resource is configured every 10 ms (including time for monitoring RAR), a new RA preamble is transmitted every 10 ms if RAR is not received. Based on the preambleTransMax, the RA failure may occur before TTT is completed and may lead to RLF even in CHO configured cases.

The above examples are only for illustration purposes and the application is not limited to the illustration. This combination of report configuration for CHO evaluation can be done in any combination or same/different reporting configuration with same/different trigger quantities, same/different RS-types, or the like. In an embodiment of the disclosure, the base station (200) can configure multiple CHO conditions to the UE.

As shown in the FIG. 4B, at operation S402b, the UE (100) sends the measurement report to the SgNB (300). At operation S404b, based on the measurement report, the SgNB (300) sends the handover request for CHO to the TgNB1 (400a). Based on the handover request, at operation S406b, the TgNB1 (400a) performs the admission control procedure. Based on the admission control procedure, at operation S408b, the TgNB1 (400a) sends the handover request acknowledge message to the SgNB (300). At operation S410b, the SgNB (300) sends the CHO configuration to the UE (100) and at operation S412b, the UE (100) performs the CHO candidate evaluation. At operation S414b, the UE (100) sends the MR indicating Normal HO to TgNB-2 (400b) through the SgNB (300).

At operation S416b, the SgNB (300) sends the handover request for normal HO to the TgNB2 (400b). At operation S418b, the UE (100) sends the MR indicating CHO execution to the TgNB-1 (400a) through the SgNB (300). Based on the handover request, at operation S420b, the TgNB2 (400b) performs the admission control procedure. Based on the admission control procedure, at operation S422b, the TgNB2 (400b) sends the handover request acknowledge message to the SgNB (300).

At operation S424b, the SgNB (300) sends the normal HO command to the UE (100) and operation S426b, in the SgNB (300), the normal HO execution indication received first and CHO indication from the UE (100) is ignored. At operation 430b, the UE (100) detaches from the source cell and tune to target cell. At operation S428b, the SgNB (300) sends the SN status transfer message to the TgNB1 (400a) and at 432b, the SgNB (300) sends the data forwarding to the TgNB1 (400a). At operation S434b, the RAN handover completion is occurred between the UE (100) and the TgNB1 (400a). At operation S436b, the TgNB1 (400a) sends the path switch request to the CN (500). At operation S438b, the CN (500) sends the path switch request acknowledge message to the TgNB (400). At operation S440b, the TgNB1 (400a) sends the UE context release to the SgNB (300).

Figure 5:
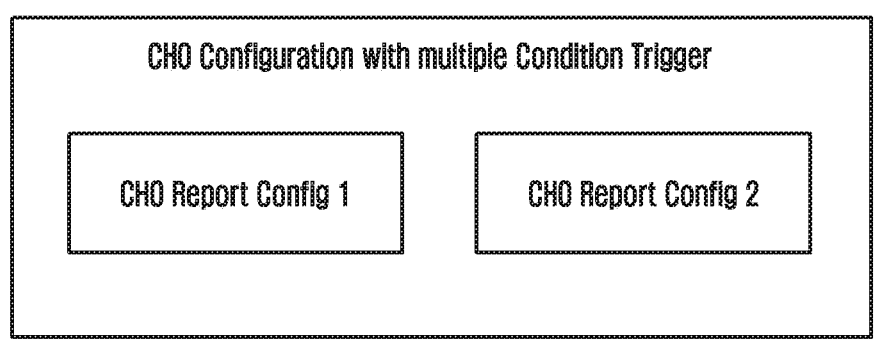
FIG. 5 illustrates a base station configuring a UE with multiple CHO condition to enable the UE to evaluate candidate target cells for execution CHO according to an embodiment of the disclosure.

FIG. 5 illustrates a base station may configure a UE with a 1 bit indication (multipleConditionTrigger) along with a CHO condition configuration to provide a UE with more freedom in decision making according to an embodiment of the disclosure.

Referring to FIG. 5, to provide the UE (100) with more judicious control in decision making, the base station (200) may configure the UE (100) with a 1 bit indication (multipleConditionTrigger in the FIG. 5) along with the CHO condition configuration. If the indication is configured in CHO configuration, then it means that there are multiple reporting configurations provided CHO is executed only if all the reporting configurations are satisfied. If the field is absent, it either means that only one reporting configuration is provided, or that multiple reporting condition is provided but CHO can be executed if any of the configured report configurations are satisfied. FIG. 5 also illustrates that the network is configuring the UE with multiple CHO conditions to enable the UE to evaluate candidate target cells for execution CHO.

Figure 6:
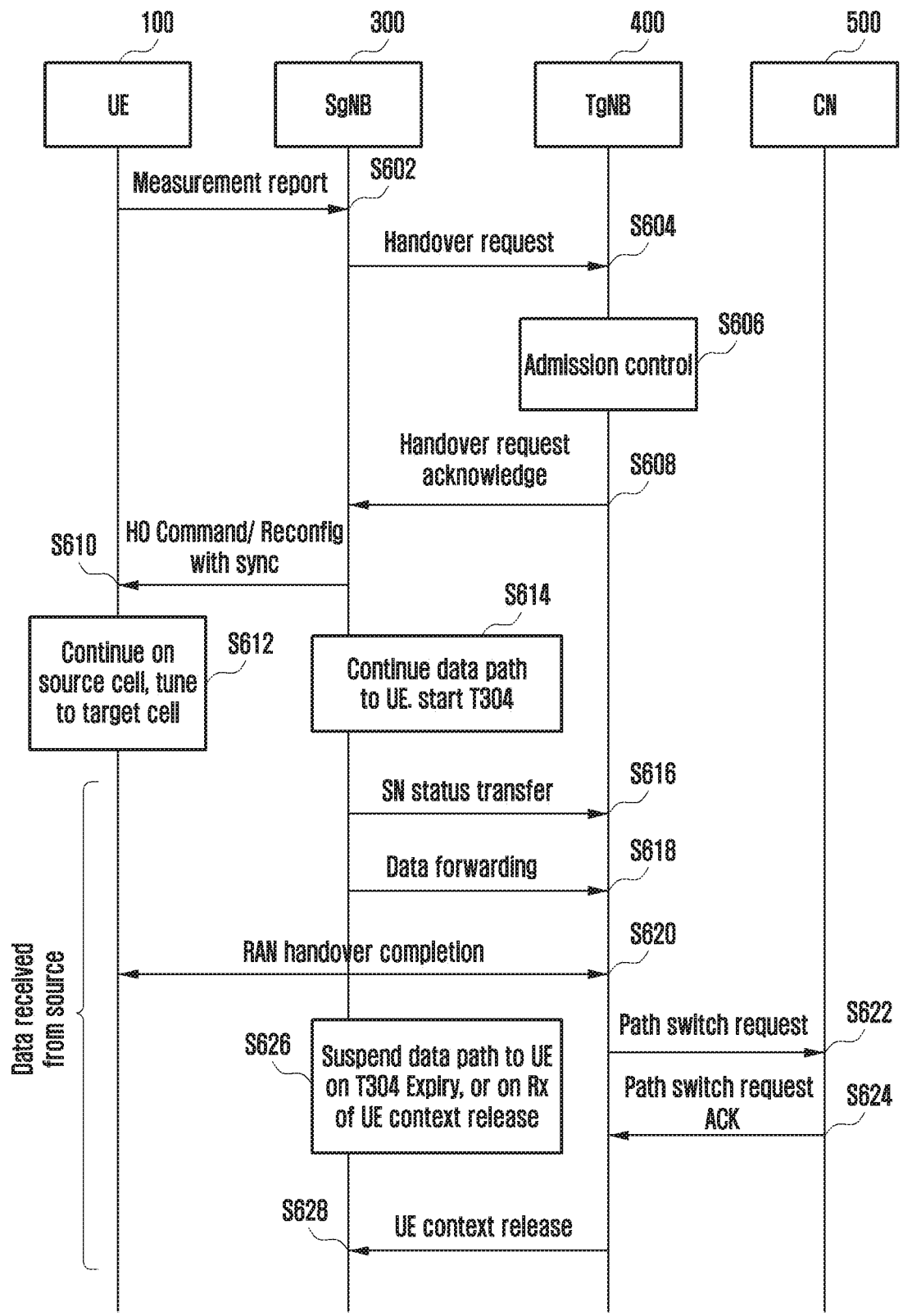
FIG. 6 illustrates a sequence diagram in which a source cell continues to serve a UE even after providing handover command, until an expiry of a timer at a source cell that is equivalent to T304 timer configure to the UE for handover, or on an event of receiving UE CONTEXT RELEASE message from a target cell on successful completion of path switch according to an embodiment of the disclosure.

FIG. 6 illustrates a sequence diagram in which a source cell continues to serve a UE even after providing handover command, until an expiry of timer at a source cell that is equivalent to T304 timer configure to the UE for handover, or on an event of receiving UE CONTEXT RELEASE message from target cell on successful completion of path switch according to an embodiment of the disclosure.

Referring to FIG. 6, at operation S602, the UE (100) sends the measurement report to the SgNB (300). At operation S604, based on the measurement report, the SgNB (300) sends the handover request to the TgNB (400). Based on the handover request, at operation S606, the TgNB (400) performs the admission control procedure. Based on the admission control procedure, at operation S608, the TgNB (400) sends the handover request acknowledge message to the SgNB (300). After receiving the handover request acknowledge message from the TgNB (400), at operation S610, the SgNB (300) sends the HO Command/Reconfig with sync message to the UE (100). Based on the HO Command/Reconfig with sync message, at operation S312a, the UE (100) continues on the source cell and tune to target cell. At operation S614, the SgNB (300) continues the data path to the UE (100) and starts timer T304.

At operation S616, the SgNB (300) sends the SN status transfer message to the TgNB (400) and at operation S618, the SgNB (300) sends the data forwarding to the TgNB (400). At operation S620, the RAN handover completion is occurred between the UE (100) and the TgNB (400). At operation S622, the TgNB (400) sends the path switch request to the CN (500). At operation S624, the CN (500) sends the path switch request acknowledge message to the TgNB (400). At operation S626, the TgNB (400) sends the UE context release to the SgNB (300).

In an embodiment of the disclosure, the method can be used to identify condition to stop transmission on source cell during an eMBB based handover. In release 14 make before break handover in LTE, the UE (100) continues to receive on the source cell even after receiving handover command from the base station (200). However, the base station (200) is unaware of the time until which the UE (100) continues monitoring DL channels from source cell. This is because the UE (100) is assumed to have a single receive chain (single Rx) and cannot receive from both source and target at the same time. Therefore, it is not possible for source to correctly estimate the time it takes for the UE (100) to tune to the target cell and perform random access. As a result, the time till which the UE (100) receives data from source cell and the time until which the source continues DL transmission are left to implementation.

In release 16, both LTE and NR are working towards an enhancement to the MBB procedure where the UE (100) is expected to have 2 receive chains. Therefore, it is possible for the UE (100) to receive from both source cell and target cell at the same time. As a result, it is possible for the source to continue transmission on the source cell and for the UE (100) to receive on the source cell till successful access to the target cell. Therefore it is possible to correctly identify when the source cell can stop transmission to the UE (100). One way is for the UE (100) to indicate to the source cell via MAC CE or other uplink signaling methods when the UE (100) releases source cell connection and performs actions only on target cell. However, this method is not reliable as the signal condition to the source cell is expected to be very poor and the probability of successfully sending indication to source cell is very small.

Another way to indicate release of the source cell, is for the target cell to indicate to the source cell once the UE (100) has successfully accessed the target cell (handover completion on the target cell). However, this method can be lead to a delay in indicating to the source cell with the added overhead of introducing a new signaling from the target cell to the source cell requesting source to suspend activity from the source cell.

In another embodiment of the disclosure, the method can be used for the source cell to continue activity after providing handover command to the UE (100), till the expiry of a timer or occurrence of an event. In an embodiment of the disclosure, the source cell continues to serve the UE (100) even after providing handover command, until the expiry of timer at the source cell that is equivalent to T304 timer configure to the UE (100) for handover, or on the event of receiving UE CONTEXT RELEASE message from the target cell on successful completion of path switch. This is illustrated if FIG. 6. In another embodiment of the disclosure, the source cell may continue serving the UE (100) until a portion of T304 timer.

In an embodiment of the disclosure, the method can be used to indicate the Beam ID in accessibility measurements in a logged MDT. In LTE, the accessibility measurement contains number of preambles sent during the failed connection establishment attempt and the location information among other parameters. In a beamformed system, it is possible that the UE (100) is in coverage of more than one beam. The UE (100) selects a beam for random access based on the threshold configured in a system information. Therefore, different UEs in same location receiving signal from the same set of beams may attempt connection establishment based on PRACH resources associated to different beams. As a result, to correctly evaluate the resources used when the UE (100) encountered connection establishment failure, the UE (100) needs to indicate the SSB which it selected to access the cell. In an embodiment of the disclosure, the SSB ID on which the UE (100) encountered connection establishment failure is indicated to the base station (200) in accessibility measurement as given below:

In the LTE, the accessibility measurement contains number of preambles sent during the failed connection establishment attempt and the location information among other parameters, and the same can be reused for NR resume failure report. In the beamformed system, it is possible that the UE (100) is in coverage of more than one beam. The UE (100) selects a beam for random access based on the threshold configured in the system information. Therefore, different UEs in same location receiving signal from the same set of beams may attempt connection resume based on PRACH resources associated to different beams. As a result, to correctly evaluate the resources used when the UE (100) encountered connection resume failure, the UE (100) needs to indicate the SSB which it selected to access the cell. In another embodiment of the disclosure, the SSB id on which the UE (100) encountered connection resume failure is indicated to the base station (200) in accessibility measurement as given below:

```
ConnResumeFailReportNR ::=   SEQUENCE {
  failedCellId                 CellIdNR,
  locationInfo                 LocationInfo-r10          OPTIONAL,
  measResultFailedCell         SEQUENCE {
    rsrpResult                   RSRP-Range,
    rsrqResult                   RSRQ-Range,
    sinrResult                   SINR-Range              OPTIONAL
  },
  measResultNeighCells         SEQUENCE {
    measResultListNR             MeasResultListNR        OPTIONAL,
    measResultListEUTRA          MeasResultList2EUTRA    OPTIONAL,
  } OPTIONAL,
  numberOfPreamblesSent        NumberOfPreamblesSent
  contentionDetected           BOOLEAN,
  maxTxPowerReached            BOOLEAN,
  timeSinceFailure             TimeSinceFailure,
  measResultListNR             MeasResultListNR         OPTIONAL,
  measResultFailedCell         RSRQ-Range               OPTIONAL,
  failedCellRSRQ-Type          RSRQ-Type-r12            OPTIONAL,
  SSBid                        SSB-Index,
}
```

In another embodiment of the disclosure, the method can be used to indicate UL carrier id in accessibility measurements in logged MDT. Unlike LTE, the NR can have 2 uplink carriers (normal UL and SUL) configured for access-

```
ConnEstFailReportNR ::=     SEQUENCE {
  failedCellId                CellIdNR,
  locationInfo                LocationInfo-r10          OPTIONAL,
  measResultFailedCell        SEQUENCE {
    rsrpResult                  RSRP-Range,
    rsrqResult                  RSRQ-Range,
    sinrResult                  SINR-Range              OPTIONAL
  },
  measResultNeighCells        SEQUENCE {
    measResultListNR            MeasResultListNR        OPTIONAL,
    measResultListEUTRA         MeasResultList2EUTRA    OPTIONAL,
  } OPTIONAL,
  numberOfPreamblesSent       NumberOfPreamblesSent
  contentionDetected          BOOLEAN,
  maxTxPowerReached           BOOLEAN,
  timeSinceFailure            TimeSinceFailure,
  measResultListNR            MeasResultListNR          OPTIONAL,
  measResultFailedCell        RSRQ-Range                OPTIONAL,
  failedCellRSRQ-Type         RSRQ-Type-r12             OPTIONAL,
  SBid                        B-Index,
}
``` ing the cell. Therefore, random access for connection establishment may be performed either on normal UL or SUL PRACH resources. The carrier on which RACH is performed is dependent on the DL pathloss reference. As a result, not all the UEs in the same location may perform RACH on the same UL carrier owing to RF performance and channel variations. Therefore, to correctly evaluate the resources used when the UE (100) encountered connection resume failure, the UE (100) needs to indicate the UL carrier it selected to access the cell. In another embodiment of the disclosure, the uplink carrier on which the UE (100) encountered connection resume failure is indicated to base station (200) in the accessibility measurements:

```
ConnResumeFailReportNR ::=      SEQUENCE {
    failedCellId                    CellIdNR,
    locationInfo                    LocationInfo-r10            OPTIONAL,
    measResultFailedCell            SEQUENCE {
        rsrpResult                      RSRP-Range,
        rsrqResult                      RSRQ-Range,
        sinrResult                      SINR-Range              OPTIONAL
    },
    measResultNeighCells            SEQUENCE {
        measResultListNR                MeasResultListNR        OPTIONAL,
        measResultListEUTRA             MeasResultList2EUTRA    OPTIONAL,
    } OPTIONAL,
    numberOfPreamblesSent           NumberOfPreamblesSent
    contentionDetected              BOOLEAN,
    maxTxPowerReached               BOOLEAN,
    timeSinceFailure                TimeSinceFailure,
    measResultListNR                MeasResultListNR            OPTIONAL,
    measResultFailedCell            RSRQ-Range                  OPTIONAL,
    failedCellRSRQ-Type             RSRQ-Type-r12               OPTIONAL,
    ulCarrierIndex                  ULCarrierIndex,
}
ULCarrierIndex ::=              ENUMERATED {NormalUL, SUL}
``` resources used when the UE (100) encountered connection establishment failure, the UE (100) needs to indicate the UL carrier it selected to access the cell. In an embodiment of the disclosure, the uplink carrier on which the UE (100) encountered connection establishment failure is indicated to base station (200) in accessibility measurements:

```
ConnEstFailReportNR ::=         SEQUENCE {
    failedCellId                    CellIdNR,
    locationInfo                    LocationInfo-r10            OPTIONAL,
    measResultFailedCell            SEQUENCE {
        rsrpResult                      RSRP-Range,
        rsrqResult                      RSRQ-Range,
        sinrResult                      SINR-Range              OPTIONAL
    },
    measResultNeighCells            SEQUENCE {
        measResultListNR                MeasResultListNR        OPTIONAL,
        measResultListEUTRA             MeasResultList2EUTRA    OPTIONAL,
    } OPTIONAL,
    numberOfPreamblesSent           NumberOfPreamblesSent
    contentionDetected              BOOLEAN,
    maxTxPowerReached               BOOLEAN,
    timeSinceFailure                TimeSinceFailure,
    measResultListNR                MeasResultListNR            OPTIONAL,
    measResultFailedCell            RSRQ-Range                  OPTIONAL,
    failedCellRSRQ-Type             RSRQ-Type-r12               OPTIONAL,
    ulCarrierIndex                  ULCarrierIndex,
}
ULCarrierIndex ::=              ENUMERATED {NormalUL, SUL}
```

Unlike LTE, NR can have 2 uplink carriers (normal UL and SUL) configured for accessing the cell. Therefore, random access for connection resume may be performed either on normal UL or SUL PRACH resources. The carrier on which RACH is performed is dependent on the DL pathloss reference. As a result, not all the UEs in the same location may perform RACH on the same UL carrier owing to RF performance and channel variations. Therefore, to In another embodiment of the disclosure, the method can be used to indicate the UE capability to support different enhanced mobility procedures for handover. There are multiple ways in which mobility interruption time can be reduced based on a make before break type of handover. It is possible that the UE (100) support more than one type of MBB/enhanced MBB based handover depending on the scenario and UE capability. Therefore, it is required for the UE (100) to indicate to the base station (200) about its capability and supported ways of performing MBB based handover. This has to be indicated as part of UE capability. In an embodiment of the disclosure, the UE (100) possess the capability to support either one of single stack based enhanced MBB HO or a dual stack based enhanced MBB HO or both.

In a single stack based mobile broadband (MBB) solution, only one protocol stack is fully activated at a given time and other protocol stack is not fully activated. For example, on receiving single stack based eMBB handover command from the base station (200), the UE (100) maintains the full stack on source cell and continues operation on source until a particular time. During this time, the target stack may be partially active or not active at all based on UE capability. Once the access to the target cell has been successful, the UE (100) releases the source cell associated protocol stack and functions using only the protocol stack associated to the target.

In a dual stack based MBB solution, the UE (100) can have the protocol stack associated with source cell and the protocol stack associated to the target cell active at the same time. The two stacks are simultaneously active only for a short duration to facilitate transition of resources/packets from source cell to target cell. An illustration of UE capability indicating support of mobility type is provided below:

```
MeasAndMobParameters ::=            SEQUENCE {
    measAndMobParametersCommon      MeasAndMobParametersCommon      OPTIONAL,
    measAndMobParametersXDD-Diff    MeasAndMobParametersXDD-Diff    OPTIONAL,
    measAndMobParametersFRX-Diff    MeasAndMobParametersFRX-Diff    OPTIONAL
}
MeasAndMobParametersCommon ::=      SEQUENCE {
    supportedGapPattern             BIT STRING (SIZE (22))          OPTIONAL,
    ssb-RLM                         ENUMERATED {supported}          OPTIONAL,
    ssb-AndCSI-RS-RLM               ENUMERATED {supported}          OPTIONAL,
    ...,
    [[
    eventB-MeasAndReport            ENUMERATED {supported}          OPTIONAL,
    handoverFDD-TDD                 ENUMERATED {supported}          OPTIONAL,
    eutra-CGI-Reporting             ENUMERATED {supported}          OPTIONAL,
    nr-CGI-Reporting                ENUMERATED {supported}          OPTIONAL
    ]],
    [[
    independentGapConfig            ENUMERATED {supported}          OPTIONAL,
    periodicEUTRA-MeasAndReport     ENUMERATED {supported}          OPTIONAL,
    handoverFR1-FR2                 ENUMERATED {supported}          OPTIONAL,
    maxNumberCSI-RS-RRM-RS-SINR     ENUMERATED {n4, n8, n16, n32, n64, n96}    OPTIONAL
    ]],
    [[
    nr-CGI-Reporting-ENDC           ENUMERATED {supported}          OPTIONAL
    ]],
      [[
      enhancedMBBSupport-R16        ENUMERATED {singleStack, dualStack, both}    OPTIONAL
      ]]
}
```

In another embodiment of the disclosure, the method can be used to indicate the MBB type UE should apply for the configured handover. As the UE (100) can support more than one type of MBB based handover—namely single stack and dual stack based MBB HO—it is required that the UE (100) is indicated on the type of handover that has to be performed when reconfiguration with sync is provided to it. Therefore, the base station (200) provides the MBB type that needs to be used for the current handover based on several factors, which may include UE capability, interruption requirement for the ongoing service, deployment scenario, or the like. In an embodiment of the disclosure, the serving PCell indicates to the UE (100) about the type of MBB it has to apply for the current handover.

This indication can be provided as part of reconfiguration with sync in several ways. One way is to always provide the mobility type in reconfig with sync/handover command. This indication would explicitly inform the UE (100) of the type of MBB it needs to apply as illustrated below:

```
ReconfigurationWithSync ::=     SEQUENCE {
    spCellConfigCommon          ServingCellConfigCommon     OPTIONAL,       -- Need M
    newUE-Identity              RNTI-Value,
    t304                        ENUMERATED {ms50, ms100, ms150, ms200, ms500, ms1000, ms2000, ms10000},
    rach-ConfigDedicated        CHOICE {
        uplink                      RACH-ConfigDedicated,
        supplementaryUplink         RACH-ConfigDedicated
    }                                                       OPTIONAL,       -- Need N
    ...,
    [[
    smtc                        SSB-MTC                     OPTIONAL        -- Need S
    ]],
      [[
      enhancedMbbType-r16       ENUMERATED    {singleStack, dualStack}  OPTIONAL Need N
      ]]
}
```

In another embodiment of the disclosure, the method can optionally include the indication where, if included the handover has to be dual stack based MBB HO, and the single stack based MBB HO if the indication is not included (or vice versa) as illustrated below:

Certain examples of the disclosure may be provided in the form of a base station (e.g. gNB) and/or method therefore. Certain examples of the disclosure may be provided in the form of a mobile device (e.g. UE) and/or method therefore. Certain examples of the disclosure may be provided in the

```
ReconfigurationWithSync ::=    SEQUENCE {
    spCellConfigCommon          ServingCellConfigCommon                             OPTIONAL,    -- Need M
    newUE-Identity              RNTI-Value,
    t304                        ENUMERATED {ms50, ms100, ms150, ms200, ms500, ms1000, ms2000, ms10000},
    rach-ConfigDedicated        CHOICE {
        uplink                      RACH-ConfigDedicated,
        supplementaryUplink         RACH-ConfigDedicated
    }                                                                               OPTIONAL,    -- Need N
    ...,
    [[
    smtc                        SSB-MTC                                             OPTIONAL     -- Need S
    ]],
        [[
        enhancedMbbType-r16     ENUMERATED     {dualStack}     OPTIONAL Need N
        ]]
}
```

Figure 7:
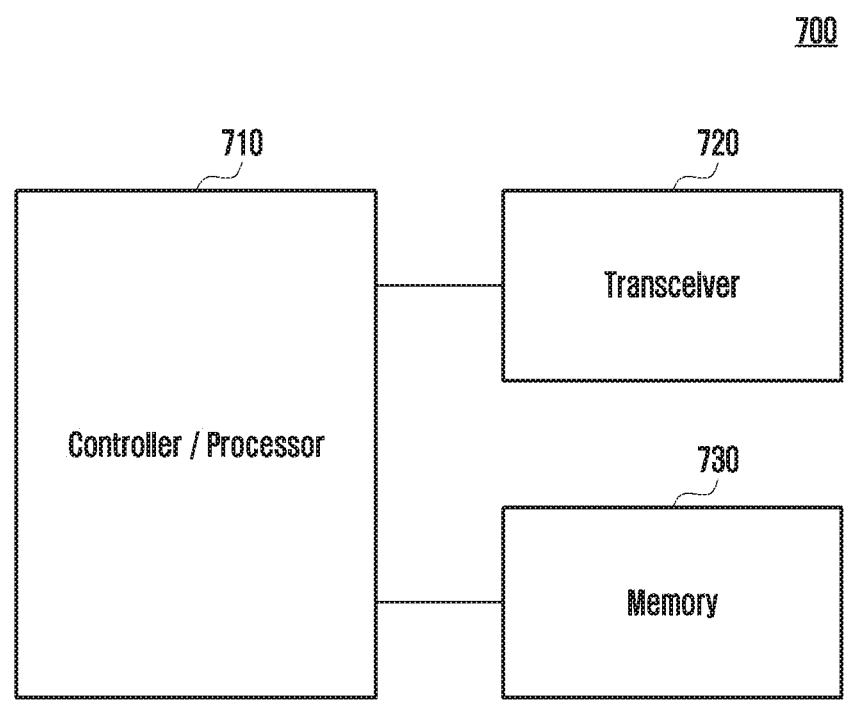
FIG. 7 illustrates a user equipment (UE) according to an embodiment of the disclosure.

FIG. 7 illustrates a user equipment (UE) according to an embodiment of the disclosure.

Referring to FIG. 7, the UE 700 may include a controller/processor 710, a transceiver 720 and a memory 730. However, all of the illustrated components are not essential. The UE 700 may be implemented by more or less components than those illustrated in FIG. 7. In addition, the controller/processor 710 and the transceiver 720 and the memory 730 may be implemented as a single chip according to another embodiment.

The aforementioned components will now be described in detail.

The controller/processor 710 may include one or more controller/processors or other processing devices that control the proposed function, process, and/or method. Operation of the UE 700 may be implemented by the controller/processor 710.

In one embodiment, the controller/processor 710 may measure the signal strength from one or more base stations and transmit PRS with a power determined based on the measurements.

In one embodiment, the controller/processor 710 may receive signaling from a base station and transmit PRS with a power determined based on the signaling.

The transceiver 720 may include a RF transmitter for up-converting and amplifying a transmitted signal, and a RF receiver for down-converting a frequency of a received signal. However, according to another embodiment, the transceiver 720 may be implemented by more or less components than those illustrated in components.

The transceiver 720 may be connected to the controller/processor 710 and transmit and/or receive a signal. The signal may include control information and data. In addition, the transceiver 720 may receive the signal through a wireless channel and output the signal to the controller/processor 710. The transceiver 720 may transmit a signal output from the controller/processor 710 through the wireless channel.

The memory 730 may store the control information or the data included in a signal obtained by the UE 700. The memory 730 may be connected to the controller/processor 710 and store at least one instruction or a protocol or a parameter for the proposed function, process, and/or method. The memory 730 may include read-only memory (ROM) and/or random access memory (RAM) and/or hard disk and/or CD-ROM and/or DVD and/or other storage devices.

form of a system comprising one or more base stations and one or more mobile devices, and/or method therefore.

Figure 8:
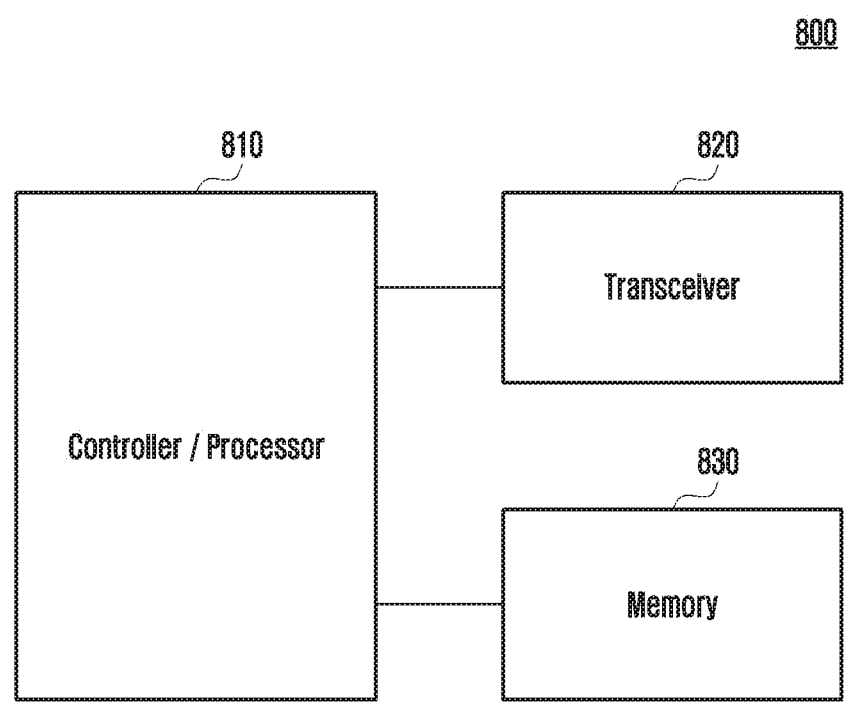
FIG. 8 illustrates a block diagram of a base station (BS) according to an embodiment of the disclosure.

FIG. 8 illustrates a block diagram of a base station (BS) according to an embodiment of the disclosure.

Referring to FIG. 8, the BS 800 may include a controller/processor 810, a transceiver 820 and a memory 830. However, all of the illustrated components are not essential. The BS 800 may be implemented by more or less components than those illustrated in FIG. 8. In addition, the controller/processor 810 and the transceiver 820 and the memory 830 may be implemented as a single chip according to another embodiment.

The aforementioned components will now be described in detail.

The controller/processor 810 may include one or more controller/processors or other processing devices that control the proposed function, process, and/or method. Operation of the BS 800 may be implemented by the controller/processor 810.

In one embodiment, the controller/processor 810 may map PRS to Resource Elements (REs) of a frame structure and transmit the frame structure such that the power used to transmit REs containing PRS is higher than the power used to transmit REs not containing PRS.

The transceiver 820 may include a RF transmitter for up-converting and amplifying a transmitted signal, and a RF receiver for down-converting a frequency of a received signal. However, according to another embodiment, the transceiver 820 may be implemented by more or less components than those illustrated in components.

The transceiver 800 may be connected to the controller/processor 810 and transmit and/or receive a signal. The signal may include control information and data. In addition, the transceiver 820 may receive the signal through a wireless channel and output the signal to the controller/processor 810. The transceiver 820 may transmit a signal output from the controller/processor 810 through the wireless channel.

The memory 830 may store the control information or the data included in a signal obtained by the BS 800. The memory 830 may be connected to the controller/processor 810 and store at least one instruction or a protocol or a parameter for the proposed function, process, and/or method. The memory 830 may include read-only memory (ROM) and/or random access memory (RAM) and/or hard disk and/or CD-ROM and/or DVD and/or other storage devices.

The embodiments described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, controller/processors, controllers, modules, units, and the like, each element configured to perform one or more corresponding processes, operations and/or method operations for implementing the techniques described herein. For example, an operation of X may be performed by a module configured to perform X (or an X-module). The one or more elements may be implemented in the form of hardware, software, or any combination of hardware and software.

The skilled person will appreciate that a given process, operation and/or method operation disclosed herein may be performed by a single entity (hardware and/or software), or the performance of such a process, operation and/or method operation may be distributed and performed by two or more entities in cooperation. The skilled person will also appreciate that a single entity (hardware and/or software) may be configured to perform one process, operation and/or method operation disclosed herein, or may be configured to perform two or more such processes, operations and/or method operations.

It will be appreciated that examples of the disclosure may be implemented in the form of hardware, software or any combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain examples of the disclosure. Accordingly, certain example provide a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

The above flowcharts and flow diagrams illustrate examples of methods and processes that can be implemented in accordance with the principles of the disclosure and various changes could be made to the methods and processes illustrated in the flowcharts and flow diagrams. For example, while shown as a series of operations, various operations in each figure could overlap, occur in parallel, occur in a different order, or occur multiple times. In another example, operations may be omitted or replaced by other operations.

Various changes and modifications may be suggested to one skilled in the art. It is intended that the disclosure encompass such changes and modifications as fall within the scope of the appended claims. None of the description in this application should be read as implying that any particular element, operation, or function is an essential element that must be included in the claims scope. The scope of patented subject matter is defined only by the claims.

The embodiments herein are applicable for LTE, NR and other cellular communication technologies and the reference to any one of these technologies in the disclosure is only for the purpose of illustration and not restricted by it.

The embodiments disclosed herein can be implemented using at least one software program running on at least one hardware device and performing network management functions to control the elements.

The various actions, acts, blocks, operations, or the like in the flowchart (S200a and S200b) may be performed in the order presented, in a different order or simultaneously. Further, in some embodiments of the disclosure, some of the actions, acts, blocks, operations, or the like may be omitted, added, modified, skipped, or the like without departing from the scope of the disclosure.

While the disclosure has been shown and described with reference to various embodiments thereof, it will be understood by those skilled in the art that various changes in form and details may be made therein without departing from the spirit and scope of the disclosure as described defined by the appended claims and their equivalents.

What is claimed is:

1. A method performed by a terminal in a wireless communication system, the method comprising:
   receiving, from a source cell, a radio resource control (RRC) message including a conditional handover (CHO) configuration, wherein the CHO configuration includes an execution condition associated with a candidate target cell, the execution condition including a first measurement identity (ID) and a second measurement ID;
   identifying whether a first triggering condition corresponding to the first measurement ID and a second triggering condition corresponding to the second measurement ID are fulfilled for the candidate target cell;
   generating a measurement report including a target cell ID to which the CHO is to be executed, in case that both of the first triggering condition and the second triggering condition are fulfilled;
   transmitting, to the source cell, the measurement report, before the CHO; and
   executing the CHO to the target cell, after transmitting the measurement report.

2. The method of claim 1,
   wherein the first measurement ID corresponds to a first reporting configuration associated with the first triggering condition and the second measurement ID corresponds to a second reporting configuration associated with the second triggering condition.

3. The method of claim 2,
   wherein the first reporting configuration includes information on a first trigger quantity for the first triggering condition and the second reporting configuration includes information on a second trigger quantity for the second triggering condition, and
   wherein each of the first trigger quantity and the second trigger quantity is one of a reference signals received power (RSRP), a reference signal received quality (RSRQ) or a signal-to-interference-plus-noise ratio (SINR).

4. The method of claim 3,
   wherein the first trigger quantity and the second trigger quantity are different from each other, and
   wherein a reference signal type associated with the first reporting configuration and a reference signal type associated with the second reporting configuration are same.

5. The method of claim 1, further comprising:
transmitting, to the source cell, capability information of the terminal,
wherein the execution condition is determined based on the capability information.

6. A method performed by a source cell in a wireless communication system, the method comprising:
transmitting, to a terminal, a radio resource control (RRC) message including a conditional handover (CHO) configuration;
receiving, from the terminal, a measurement report including a target cell ID to which the CHO is to be executed, before the CHO;
transmitting, to the target cell, a sequence number (SN) status for the terminal in response to the measurement report; and
forwarding, to the target cell, data for the terminal,
wherein the CHO configuration includes an execution condition associated with a candidate target cell, the execution condition including a first measurement identity (ID) and a second measurement ID, and
wherein the CHO is executed to the candidate target cell based on the CHO configuration, in case that both of a first triggering condition corresponding to the first measurement ID and a second triggering condition corresponding to the second measurement ID are fulfilled for the candidate target cell.

7. The method of claim 6,
wherein the first measurement ID corresponds to a first reporting configuration associated with the first triggering condition and the second measurement ID corresponds to a second reporting configuration associated with the second triggering condition.

8. The method of claim 7,
wherein the first reporting configuration includes information on a first trigger quantity for the first triggering condition and the second reporting configuration includes information on a second trigger quantity for the second triggering condition, and
wherein each of the first trigger quantity and the second trigger quantity is one of a reference signals received power (RSRP), a reference signal received quality (RSRQ) or a signal-to-interference-plus-noise ratio (SINR).

9. The method of claim 8,
wherein the first trigger quantity and the second trigger quantity are different from each other, and
wherein a reference signal type associated with the first reporting configuration and a reference signal type associated with the second reporting configuration are same.

10. The method of claim 6, further comprising:
receiving, from the terminal, capability information of the terminal,
wherein the execution condition is determined based on the capability information.

11. A terminal in a wireless communication system, the terminal comprising:
a transceiver configured to transmit and receive a signal; and
a controller coupled with the transceiver and configured to:
receive, from a source cell, a radio resource control (RRC) message including a conditional handover (CHO) configuration, wherein the CHO configuration includes an execution condition associated with a candidate target cell, the execution condition including a first measurement identity (ID) and a second measurement ID,
identify whether a first triggering condition corresponding to the first measurement ID and a second triggering condition corresponding to the second measurement ID are fulfilled for the candidate target cell,
generate a measurement report including a target cell ID to which the CHO is to be executed, in case that both of the first triggering condition and the second triggering condition are fulfilled,
transmit, to the source cell, the measurement report, before the CHO, and
execute the CHO to the target cell, after transmitting the measurement report.

12. The terminal of claim 11,
wherein the first measurement ID corresponds to a first reporting configuration associated with the first triggering condition and the second measurement ID corresponds to a second reporting configuration associated with the second triggering condition.

13. The terminal of claim 12,
wherein the first reporting configuration includes information on a first trigger quantity for the first triggering condition and the second reporting configuration includes information on a second trigger quantity for the second triggering condition, and
wherein each of the first trigger quantity and the second trigger quantity is one of a reference signals received power (RSRP), a reference signal received quality (RSRQ) or a signal-to-interference-plus-noise ratio (SINR).

14. The terminal of claim 13,
wherein the first trigger quantity and the second trigger quantity are different from each other, and
wherein a reference signal type associated with the first reporting configuration and a reference signal type associated with the second reporting configuration are same.

15. The terminal of claim 11,
wherein the controller is further configured to transmit, to the source cell, capability information of the terminal, and
wherein the execution condition is determined based on the capability information.

16. A source cell in a wireless communication system, the source cell comprising:
a transceiver configured to transmit and receive a signal; and
a controller coupled with the transceiver and configured to:
transmit, to a terminal, a radio resource control (RRC) message including a conditional handover (CHO) configuration,
receive, from the terminal, a measurement report including a target cell ID to which the CHO is to be executed, before the CHO,
transmit, to the target cell, a sequence number (SN) status for the terminal in response to the measurement report, and
forwarding, to the target cell, data for the terminal,
wherein the CHO configuration includes an execution condition associated with a candidate target cell, the execution condition including a first measurement identity (ID) and a second measurement ID, and wherein the CHO is executed to the candidate target cell based on the CHO configuration, in case that both of a first triggering condition corresponding to the first measurement ID and a second triggering condition corresponding to the second measurement ID are fulfilled for the candidate target cell.

17. The source cell of claim 16,
wherein the first measurement ID corresponds to a first reporting configuration associated with the first triggering condition and the second measurement ID corresponds to a second reporting configuration associated with the second triggering condition.

18. The source cell of claim 17,
wherein the first reporting configuration includes information on a first trigger quantity for the first triggering condition and the second reporting configuration includes information on a second trigger quantity for the second triggering condition, and
wherein each of the first trigger quantity and the second trigger quantity is one of a reference signals received power (RSRP), a reference signal received quality (RSRQ) or a signal-to-interference-plus-noise ratio (SINR).

19. The source cell of claim 18,
wherein the first trigger quantity and the second trigger quantity are different from each other, and
wherein a reference signal type associated with the first reporting configuration and a reference signal type associated with the second reporting configuration are same.

20. The source cell of claim 16,
wherein the controller is further configured to receive, from the terminal, capability information of the terminal,
wherein the execution condition is determined based on the capability information.

* * * * *